(12) United States Patent
Cantolino

(10) Patent No.: US 7,710,283 B1
(45) Date of Patent: May 4, 2010

(54) FLUID-LEVEL SENSING DEVICE WITH ENCAPSULATED MICRO SWITCH

(76) Inventor: Christopher Ralph Cantolino, 2614 Manatee Ave. West, Bradenton, FL (US) 34205

( * ) Notice: Subject to any disclaimer, the term of this patent is extended or adjusted under 35 U.S.C. 154(b) by 307 days.

(21) Appl. No.: 12/012,307

(22) Filed: Jan. 31, 2008

(51) Int. Cl.
  *G08B 21/00* (2006.01)
(52) U.S. Cl. .................. 340/623; 340/603; 340/604; 340/605; 340/606; 340/612; 340/618; 210/96.2; 210/321.6
(58) Field of Classification Search .......... 340/603–606, 340/612, 618, 623; 210/96.2, 321.6
See application file for complete search history.

(56) References Cited

U.S. PATENT DOCUMENTS 6,140,925 A * 10/2000 Lee et al. ................. 340/618
6,339,985 B1    1/2002 Whitney
2002/0047783 A1 * 4/2002 Bergum et al. ............. 340/618
2006/0138031 A1 * 6/2006 Kloos et al. ............... 210/96.2

* cited by examiner

*Primary Examiner*—Davetta W Goins
*Assistant Examiner*—Ojiako Nwugo
(74) *Attorney, Agent, or Firm*—Dorothy S. Morse

(57) ABSTRACT

A fluid-level sensing device that uses the interaction of a first magnet attached to the distal end of an external micro switch arm and a second magnet positioned within the distal end of a pivoting float body to close a circuit within the micro switch and create a shut-off signal to stop fluid production. A single housing holds the micro switch and float body, wherein magnetic forces acting through the housing wall between them and other magnet-positioning materials that separate the two magnets cause signal production. After float body deployment, manual reset of the float body is accomplished via its lever-like distal end. The main body of the micro switch, which it is snap-fit into a fixed position within the upper housing chamber for use, is entirely encapsulated in waterproof material to protect it from corrosion. Alternative ways for quick mounting of the housing to a fluid-collecting pan are contemplated.

29 Claims, 27 Drawing Sheets

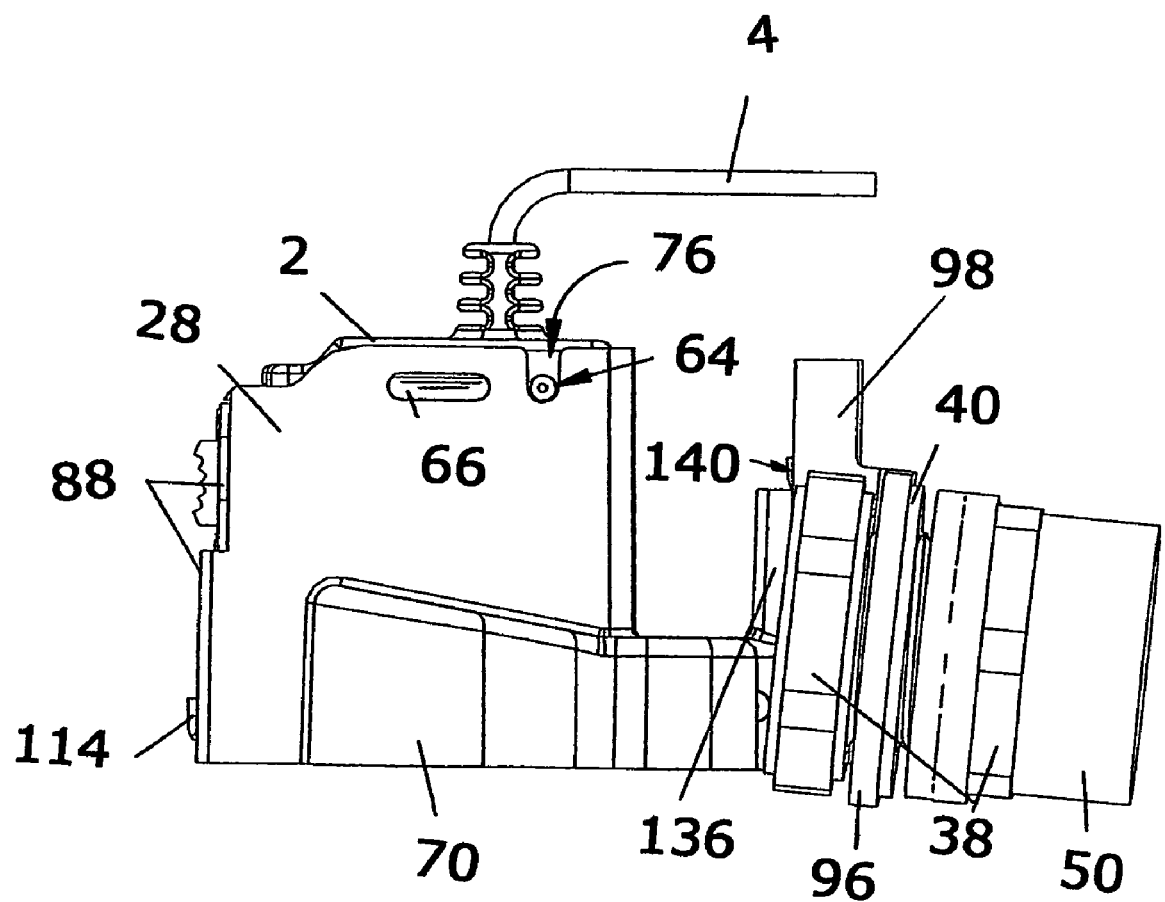
F I G. 16

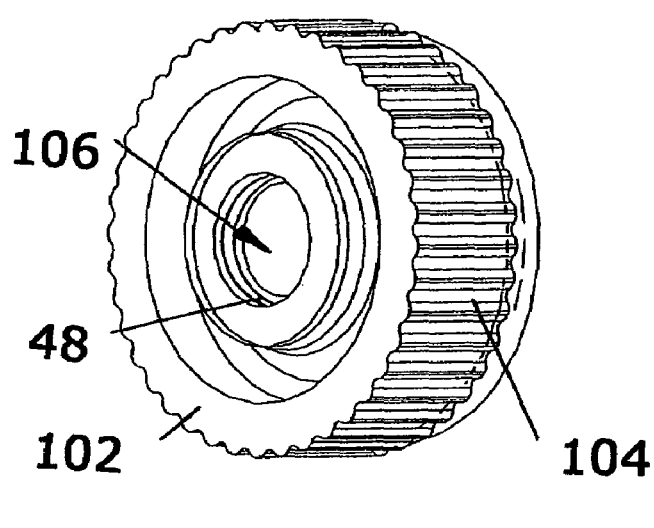
F I G. 29
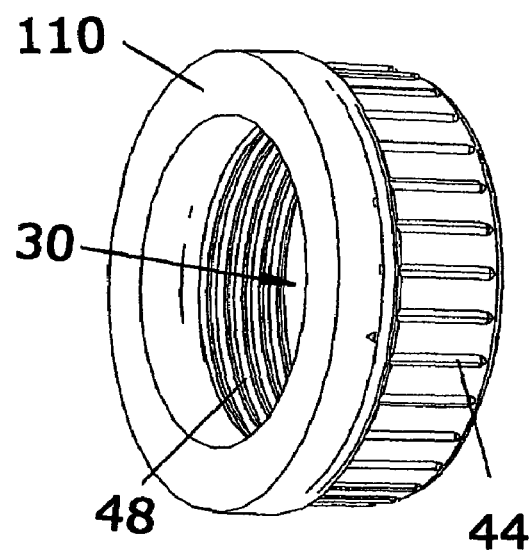
F I G. 30
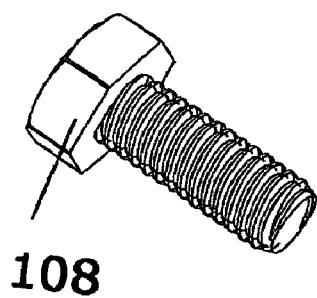
F I G. 31
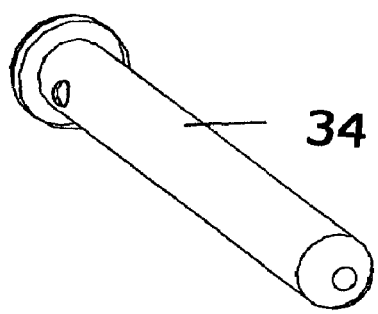
F I G. 32

FLUID-LEVEL SENSING DEVICE WITH ENCAPSULATED MICRO SWITCH

CROSS-REFERENCES TO RELATED APPLICATIONS

None.

BACKGROUND

1. Field of the Invention

This invention relates to fluid-level sensing devices used to shut off a fluid-producing system in response to rising fluid levels caused by the system that result in a risk of fluid overflow and/or damage to surroundings, specifically to a fluid-level sensing device that is typically connected to the perimeter wall of a fluid collection pan or tray associated with a fluid-producing unit, such as an air conditioning or furnace unit, and is often mounted to, with, or near a drain line connection or drain line connection assembly where it is positioned for float body deployment when rising fluid exceeds a threshold level considered safe. Hereinafter, for simplicity of description alone, the word "pan" will be used to identify a fluid-collecting device used in association with the present invention, without any intent of limitation. The present invention employs the interaction of two magnets to close a circuit in a micro switch and thereby send a shut-off signal to the fluid-producing system to stop its fluid production so that accumulated fluid in the pan monitored by the present invention fluid-level sensing device does not exceed a pre-determined level considered safe. The first magnet is attached to the distal end of an external micro switch arm and the second magnet is positioned within the distal end of a pivoting float body that vertically deploys in response to rising fluid. A single housing with two separate vertically stacked chambers (hereinafter identified as the "upper chamber" and the "lower chamber") is used to isolate the encapsulated switch in a position directly above the float body, with the magnetic forces between the upper and lower magnets interacting through the central housing wall between them, as well as through the float body's upper surface, the bottom of any magnet-holding cup attached to micro switch external arm, and any other materials used to position and/or retain the two magnets in their usable positions. After float body deployment, manual reset of the float body to its pre-deployment position is accomplished via its lever-like distal end that extends beyond the vertically-extending outer wall of the float/switch housing. Attraction or repulsion forces between the two magnets can be the triggering factor for circuit closure, but repulsion is preferred. The lower open-bottomed chamber in the housing below the micro switch is substantially filled by the buoyant float body. There is no opening through the housing's central wall to allow for communication between the lower open-bottomed float body chamber and the upper open-topped micro switch chamber. Further, the main body of the micro switch is completely encapsulated in waterproof material to protect it from corrosion and ensure reliable and long-term repeat performance. Electrical wiring extending in an upwardly direction from the micro switch connects it to the fluid-producing system for which monitoring is required, so that when the fluid level in a pan to which the present invention is attached exceeds a pre-determined threshold level considered safe, the rising fluid causes the distal end of the float body to pivot in an upwardly direction and increase magnetic interaction between the magnet it supports and the second magnet associated with the distal end of the micro switch arm, which when the threshold level is reached causes a circuit to be closed and results in an electric signal being sent to the fluid-producing system to shut it off and prevent overflow damage to the system, surrounding equipment, nearby objects, and/or adjacent materials. It is also preferred for the lower chamber of the float/switch housing to have one or more air vents that prevent airlock malfunction of the float body. However, in combination or in the alternative, the slot used to guide the lever-like distal end of the float body during its vertical deployment can be configured to serve as an effective air vent. It can also be narrow to avoid the entrance of debris and other non-fluid materials (such as algae or mold) that could interfere with effective and reliable float body performance.

Alternative ways for quick mounting of the present invention housing to a fluid-collecting pan are contemplated, including the use of a quick-mounting shelf area pre-molded into the pan that is configured to facilitate and expedite a drain line connection and placement of the float switch into a level orientation for most reliable long-term operation. Thus, when the present invention float/switch housing is permanently or temporarily associated with a mounting plate having a configuration complementary to that of a shelf area pre-molded into the pan, the act of drain line connection using the shelf-area provides immediate leveling of the float switch body relative to the pan, so that once leveling of the pan is achieved the resulting float deployment trouble-free, reliable, and reproducible without malfunction for long-term use. The lever-like distal end of the float body provides an easy test point for an installer to be certain that float body deployment occurs at the proper fluid level, typically in as little water accumulation as possible. At least one example of the manner in which threshold fluid level adjustment can be accomplished is presented later in this invention disclosure. Applications of the present invention include, but are not limited to, use in air conditioning and furnace condensate collection/overflow prevention applications for shutting off an air conditioning or furnace system when condensate collected in a pan beneath the portion of the system creates a water damage risk by exceeding a pre-established threshold amount, as well as other applications including where rising condensate/fluid beyond a safe threshold limit is undesirable and automated shut-off of the condensate/fluid source is needed or desired to eliminate back-up damage to the condensate producing system or the risk of damage to surrounding objects and structures.

2. Description of the Related Art

When condensates from air conditioning and furnace systems, as well as other condensates, are collected in a pan or tray to avoid contact with surrounding objects and structure, a risk of overflow and/or back-up into the system producing it remains. As a result, fluid-level sensing devices have been employed with collection pans and trays to shut-off the source of condensate flow when the amount of condensate collected exceeds a predetermined threshold level considered safe. However, prior art float switches have many disadvantages, including insubstantial float body shape or construction that reduces buoyancy, switching components having materials or construction with insufficient corrosion resistance, float body positioning that presents a risk of debris interference, float body positioning that presents substantial exposure to collected fluid and a risk of interference from mold and algae growth, float bodies subject to airlock malfunction, float bodies that require the collection of a substantial amount of fluid before their deployment occurs, and/or float bodies not substantially filling the associated float housing wherein prompt float body deployment is sometimes delayed or prevented by its tendency to wobble. Further, installation time of prior art devices can be lengthy when there is guess-work needed by an installer for selecting, mounting, leveling, and otherwise adjusting an appropriately matching and adjusting a float switch and condensate collection pan for correct operation in an intended application, particularly when a hole needs to be drilled in a pan. In addition, maintenance is often required after installation of prior art fluid-level sensing devices to ensure continued stable, reliable, and reproducible float body deployment for electrical shut-off of a fluid-producing unit or system when the accumulated fluid being monitored by the float switch rises beyond a threshold level considered safe. Further, air conditioning condensate collection pans are typically installed in hot attics, and other places where significant temperature fluctuations can occur, and many prior art plastic condensate collection pans have insufficient construction whereby a float switch mounted on the upper edge of the pan's perimeter wall will lean in over a period of time and no longer be maintained in the needed vertical orientation for a prompt and reliable deployment in response to excessive condensate collection in the pan.

The present invention's use of a pivoting buoyant float body in combination with two magnets overcomes deficiencies in the prior art. First, the pivoting float body of the present invention does not have a tendency to wobble, as does a freely-floating body whose vertical movement is guided by a concentric tube or rod inserted centrally through it. Second, the present invention magnets provide rapid circuit closure once the float body begins to deploy, so that a shut-off signal to halt fluid production can be sent with less collected fluid. Third, venting of the present invention float housing substantially reduces airlock formation and since its float body substantially fills the float housing chamber within which it is positioned, interference from debris is minimal. In addition, when the present invention fluid-level sensing device is in fixed association with a drain line connection having a mounting plate, mating it with a complementary configured quick-mounting shelf area in a fluid-collecting pan creates a fast and easy drain line connection, wherein switch installation is accomplished simply as a consequence of the drain line connection being made and the act of drain line connection provides immediate leveling of the float switch relative to the pan, so that once the relatively easy step of leveling the pan is achieved the resulting vertical float body deployment trouble-free, reliable, and reproducible without malfunction during long-term use. Another advantage provided by the present invention fluid-level sensing device over the known prior art is the lever-like distal end of its float body which provides an easily manipulated finger latch to allow post-installation testing by the installer to be certain the present invention fluid-level sensing device is operational and functioning according to need. When a pan with a quick-mounting shelf area is used (particularly one generally trapezoidal in configuration), attachment of the mounting plate to the shelf area also provides a substantial connection that is sturdy and not subject to changes in orientation over time that often occur as a result of sagging or lean in of prior art condensate tray or pan walls. In addition, the present invention sensing device has a sturdy/rugged design and sturdy corrosion-resistant construction. Also, since the lower chamber of the present invention float/switch housing has an open bottom configured to allow condensate collected therein to easily drain once fluid levels subside, its float body is not routinely in contact with collected condensate. Thus, the float body is less likely to become clogged with mold, algae, and/or debris, further protecting it from malfunction.

The closest inventions to the present invention appear to be those disclosed in U.S. Pat. No. 6,140,925 to Lee (2000) and U.S. Pat. No. 6,339,985 to Whitney (2002). The Whitney invention discloses a coffee maker having closure between two chambers achieved by magnetic action, with one of its magnets on the distal end of a pivoting arm. In contrast, the Lee invention discloses a magnetically operated float switch having a float body that is vertically deployable on a central rod, with the rod having a top magnet positioned below a micro switch. However, neither the Lee nor the Whitney inventions disclose a unitary housing with separate isolated vertically-stacked chambers with an open-topped upper chamber configured for holding a corrosion-resistant encapsulated micro switch above a pivoting float body in the open-bottomed lower chamber. Also, the provisions for post-installation testing, quick mounting to a condensate pan, and reducing interference to the float body by mold, algae, and/or debris, which are important to the present invention, are not discussed in the Lee and Whitney disclosures. No other apparatus is known that has the same structure, functions in the same manner, or provides all of the advantages of the present invention.

BRIEF SUMMARY OF THE INVENTION

It is the primary object of this invention to provide a fluid-level sensing device that is easily and promptly attached to a fluid-collecting pan in a desired position of use that places its pivoting float body near the base of the pan's perimeter wall, operates for extended periods of time with little or no post-installation inspection or maintenance, and when properly installed is able to rapidly, reliably, and repeatedly send electrical signals to an associated fluid-producing system to shut it off when only a small threshold amount of fluid has accumulated in the pan. It is a further object of this invention to provide a fluid-level sensing device that is configured for sturdy mounting to a pan wall so that little or no deviation from its originally installed position relative to the pan is experienced during extended periods of use. It is also an object of this invention to provide a fluid-level sensing device that is made from corrosion-resistant materials that resist premature deterioration and malfunction. A further object of this invention is to provide a fluid-level sensing device capable of proper and reliable operation when subjected to temperature extremes. It is also an object of this invention to provide a fluid-level sensing device that can be immediately and easily tested by an installer or maintenance personnel for certainty that the device is properly operational in the intended application. It is a further object of this invention to provide a fluid-level sensing device configured to facilitate its association with the perimeter wall of a fluid-collection pan, shorten installation time, and permit optional adjustment of float body distal end deployment height. It is also an object of this invention to provide a fluid-level sensing device having a rugged construction and being made from materials that do not experience performance loss as a result of exposure to widely fluctuating temperature variations. It is also an object of this invention to permanently or detachably incorporate a fluid-level sensing device as a part of a unitary switch and drain line connection assembly configured for easy and proper installation of the fluid-level sensing device simply as a result of drain line connection. It is a further object of this invention to provide a fluid-level sensing device that provides adequate venting to prevent float body airlock malfunction, facilitates fluid entry into the open-bottomed lower chamber of its float/switch housing, and reduces entry of airborne debris into the lower chamber of the float/switch housing, including the loose insulation fibers typically encountered in attics with some air conditioning applications. It is a further object of this invention to incorporate structure that substantially reduces or avoids lean-in of fluid-collection pan walls at the site of present invention installation and otherwise promotes fast and reproducible shut-off responses directed to an associated fluid-producing unit when the fluid level in the pan exceeds a pre-established threshold level considered safe.

The present invention, when properly made and used, will provide a fluid-level sensing device for use in combination with an associated collection tray or pan (often simply referred to herein as "pan" for simplicity of description and without any intent of limitation) to collect fluid and shut off the source of fluid production when the amount of collected fluid exceeds a pre-established threshold level considered safe to prevent damage to the fluid source and/or its surroundings. Potential applications of the present invention can include the monitoring of condensates collected as a result of air conditioning and furnace system operation (to prevent back-up damage to the system and/or overflow damage to surroundings), as well as the monitoring of other potential fluid risk hazards, such as but not limited to potential hot water heater malfunction. The present invention fluid-sensing device is often provided as a part of a unitary switch/drain-line connection assembly that can be easily handled by an installer to achieve rapid mounting to the perimeter wall of a fluid-collection pan in association with a pre-formed drain line opening in the perimeter wall. Attachment to the drain-line connection assembly can be permanent, temporary, or quick-release. In the alternative, the present invention may be pre-installed during pan manufacture, leaving only a simple and optional float body height adjustment for the installer at the time of pan installation and pan leveling to ensure repeatable and reproducible float body deployment during long-term use whereon little routine inspection or maintenance will be needed.

The present invention comprises a reliable fluid-level sensing device that uses the interaction of a first magnet attached to the distal end of an external micro switch arm and a second (typically larger) magnet positioned within the distal end of a pivoting float body to provide interaction of one to the other so as to trigger the snap action mechanism within the micro switch needed to close a circuit and send a shut-off signal to the fluid-producing unit to stop its fluid production. A single housing is used to place a corrosion-resistant encapsulated micro switch in an open-topped upper chamber in an isolated position above an open-bottomed lower chamber in which a pivoting float body moves in response to rising and falling fluid levels, with the magnetic forces acting through the float/switch housing's central wall, the bottom surface of a magnet-housing cup when used on the external arm of the micro switch, the top surface of the float body, and any other magnet-positioning materials that are placed between the two interacting magnets. After float body deployment takes place that causes tripping of the micro switch, manual reset of the float body is accomplished via its lever-like distal end, which can also be used quickly by an installer as a finger latch to test the float body and make certain that a newly installed fluid-sensing present invention device is fully operational to meet application requirements. Attraction or repulsion forces between the two magnets can be the triggering factor. The open-bottomed lower chamber in the float/switch housing is substantially filled by the buoyant float body. Also, there is no opening in the housing between the lower open-bottomed float body chamber and the upper chamber in which the micro switch is located to prevent direct fluid communication from the lower chamber into the upper chamber. In addition, the main body of the micro switch is completely encapsulated in waterproof material to further protect it from corrosion and enhance its reliability for long-term use, and one or more seals are typically used to secure the micro switch within the upper chamber and reduce the likelihood of fluid entry into the upper chamber from above. Electrical wiring extending in an upwardly direction from the micro switch connects it to the fluid-producing system for which monitoring is required, so that when the fluid level in a pan to which the present invention is attached exceeds a pre-determined threshold level considered safe, the rising fluid causes the distal end of the float body to pivot in an upwardly direction and increase magnetic interaction between the magnet it supports and the second magnet associated with the distal end of the micro switch arm, which when the threshold level is reached causes a circuit to be closed and results in an electric signal being sent to the fluid-producing system to shut it off and prevent overflow damage to the system, surrounding equipment, nearby objects, and/or adjacent materials.

It is also preferred for the float housing to have venting that prevents airlock malfunction of the float body. The slot used to guide the lever-like distal end of the float body during its deployment can be configured to serve as an effective air vent. In addition, several alternative mounting means for fast and secure connection of the present invention float/switch housing to a fluid-collecting pan are contemplated, including but are not limited to, the connection of a substantially trapezoidal-shaped mounting plate between the float/switch housing and a complementary trapezoidal-shaped shelf area pre-molded into the perimeter wall of the fluid collection pan for drain line connection, a quickly-releasable spring tab connection between the float/switch housing and a mounting ring with a depending spring tab housing having a rail plate, the connection of the float/switch housing via a bridge to a substantially trapezoidal-shaped mounting plate complementary in configuration to a trapezoidal-shaped shelf area integrated into the pan wall that permits pre-leveled float/switch housing installation relative to the pan, and a grooved spring tab and fastener connection of the float/switch housing to a spring tab housing with complementary ridges that depends from a substantially trapezoidal-shaped mounting plate or a bridge depending from a substantially trapezoidal-shaped mounting plate. When mounting plate of the present invention has a configuration complementary to that of the shelf area pre-molded into the pan, such as but not limited to the substantially trapezoidal shape mentioned above, the act of drain line connection using the shelf area provides immediate leveling of the float body relative to the pan, so that once leveling of the pan is achieved the resulting float deployment trouble-free, reliable, and reproducible without malfunction during long-term use. Contemplated applications include, but are not limited to, use in air conditioning and furnace system condensate collection/overflow prevention applications for shutting off an air conditioning system or furnace when collected condensate in a pan beneath the portion of the system at risk for fluid damage exceeds a pre-established threshold amount, as well as other applications including where rising condensate/fluid beyond a safe threshold limit is undesirable and automated shut-off of the condensate/fluid source is needed or desired to eliminate back-up damage to the condensate producing system or the risk of damage to surrounding objects and structures.

Further, the connection between present invention switch, when part of an assembly, to a condensate/fluid collecting pan can be easily made using a threaded connector and an O-ring, and/or other sealing means or combination that provides a leak-resistant connection between pan and assembly. The present invention assembly and pan can also each be designed so that a mounting plate configured as a part of the assembly laterally overlaps a support shelf configured as a part of the pan perimeter wall to stably align the assembly in its needed position relative to the perimeter wall and maintain the needed level orientation provided during switch installation for proper and reproducible float body deployment. The support shelf/mounting plate structure provides immediate level orientation of the float body within the assembly when the pan to which it is connected is in a substantially level orientation, and also prevents wobble in the connection between the assembly and the perimeter wall so that the level orientation immediately achieved is maintained during an extended period of use. No additional leveling of the attached assembly, or the movable float body within the float housing member of the assembly, is required by an installer for proper, reliable, and reproducible float body deployment. Also, since the pan to be used with the present invention assembly has a sturdy construction and the assembly connection to the perimeter wall is made near the base of the perimeter wall, not over its upper edge, no leveling adjustment of the float body is anticipated at any time during its long-term use due to perimeter wall sagging or lean-in, even when the pan is installed in attics or other places exposed to temperature extremes. Thus, when the assembly is factory-installed, the only adjustment typically needed at the time of its installation is an optional adjustment of the deployment height for the float body within its float switch housing, to custom set the maximum depth of condensate collection in the pan prior to float body activation. The open bottom of the float body's lower chamber also permits collected condensate within it to easily drain back into the pan, thus eliminating favorable growth conditions for algae and/or mold that might otherwise interfere with or inhibit proper and reliable float body deployment. Protection from the loose insulation fibers and other airborne debris typically encountered in attics, where condensate producing air conditioning air handlers are commonly placed, is achieved by the lack of openings in the present invention housing other than that minimally needed for reliable air venting function to prevent float body airlock, a common malfunction of prior art devices. In most applications, the float body in the present invention assembly will be positioned to react to rising levels of collected condensate before any of it enters the drain line connected to the associated pan. A dam can be optionally used over the bottom part of the opening in the drain line connection member of the assembly to block condensate flow into the drain line and thereby extend the amount of time after the threshold level of condensate collection is reached within the pan before any condensate moves into the connected drain line. Electrical connection between the micro switch in the upper housing chamber and the condensate producing unit supported on the pan is typically through wires extending upwardly from the encapsulated micro switch, but not limited thereto. Thus, the present invention fluid-sensing device is designed for fast and efficient installation, as well as for minimal inspection and maintenance after installation.

The description herein provides preferred embodiments of the present invention but should not be construed as limiting its scope. For example, variations in the size and perimeter configuration of the float body; the type of mounting plate or other mounting means associated with the float/switch housing; the amount of the lever-like distal end of the float body extending beyond the housing for used as a testing finger latch; the configuration of the pivoting connection used between the float body and the lower chamber of the float/switch housing; the length of any bridge used to separate the float/switch housing and a the drain line connection mounting plate; whether the float/switch housing is easily detachable from the bridge or mounting plate; the type of connection used between the float/switch housing and the bridge; and the height and width dimensions of the upper and lower chambers within the float/switch housing, other than those shown and described herein, may be incorporated into the present invention. Thus, the scope of the present invention should be determined by the appended claims and their legal equivalents, rather than being limited to the examples given.

BRIEF DESCRIPTION OF THE DRAWINGS

FIG. 16 is a right side view of the third preferred embodiment of unitary housing and the second preferred embodiment of drain connection mounting assembly shown in FIG. 15 that reveals the float body in its non-deployed position.

FIG. 29 is a perspective view of the threaded nut that secures the attachment plate to the upright member.

FIG. 30 is a perspective view of the nut in FIG. 27 used to secure the mounting plate assembly to the perimeter wall of a fluid collection pan, such as that shown in FIG. 14.

FIG. 31 is a perspective view of the screw used with the threaded nut to secure the attachment plate to the upright member.

FIG. 32 is an enlarged view of the hinge pin used in preferred embodiments of the present invention for pivoting movement of the float body.

LIST OF COMPONENTS

Figure 1:
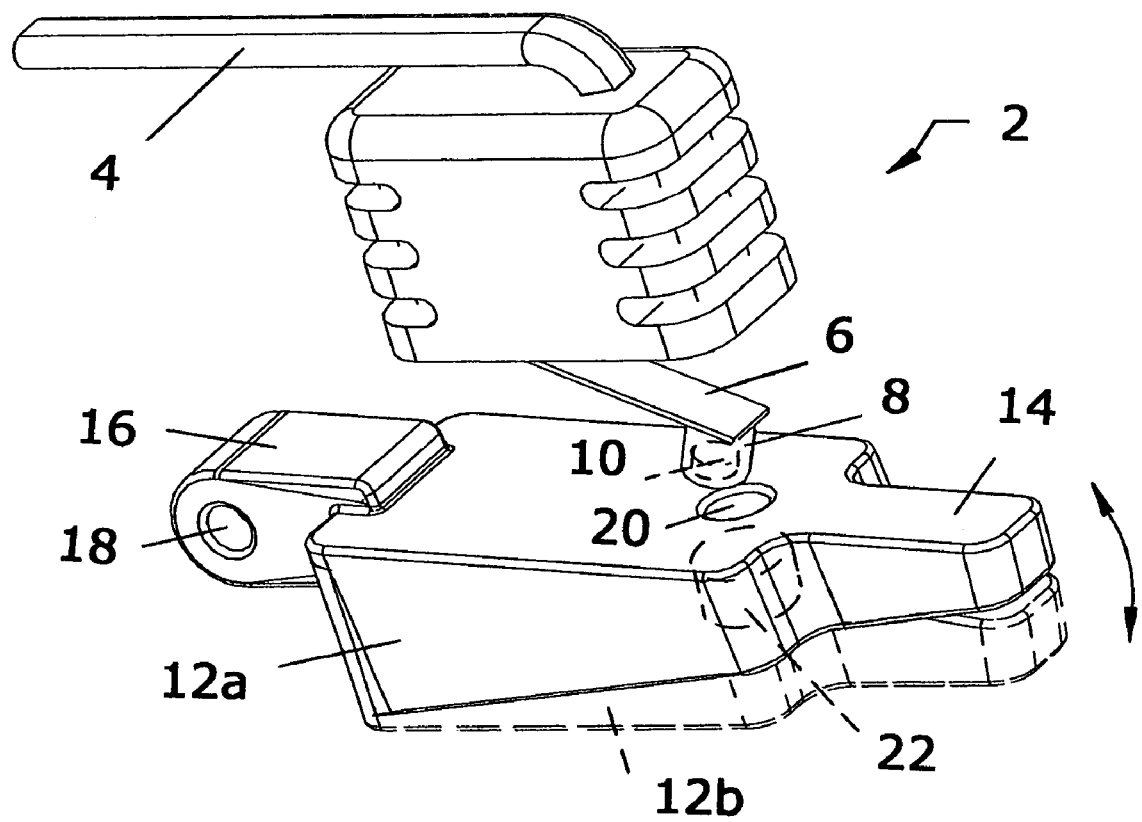
FIG. 1 is a perspective view of a first preferred embodiment of encapsulated micro switch in the present invention with its external arm carrying a small magnet close to its distal end, electrical wiring extending from the micro switch that can be connected to a fluid-producing unit, and a float body located under the micro switch in a position that allows a larger magnet within the float body to interact with the small magnet when the distal end of the pivoting float body is vertically deployed in response to rising fluid level beyond a threshold level considered safe and thereby opening or closing the micro switch to send a shut-off signal to the fluid-producing unit and avoid fluid damage as a result of back-up and/or overflow, with broken lines showing the float body in a pre-deployment position and a double-headed arrow showing the upward direction of float body deployment and the downward direction of float body reset.

2—first embodiment of a micro switch unit 68 encapsulated with waterproof material
4—electrical wiring
6—non-magnetic lever-like external micro switch arm
8—non-magnetic cup
10—small magnet associated with micro switch
12—buoyant float body
14—lever-like distal end of float body 12
16—proximal end of float body 12 providing pivoting connection
18—bore extending through proximal end 16 used for insertion of pivot pin 34
20—hollow area through top surface of float body 12 configured for housing larger magnet 22
22—larger magnet associated with float body 12
24—mounting assembly configured for connection to a drain line
26—mounting plate with wrap-around sides 52
28—unitary housing configured for housing encapsulated micro switch 2 and float body 12
30—opening configured for communication with a connected drain line
32—upper chamber of unitary housing 28 configured for holding encapsulated micro switch 2
34—pivot pin for insertion through bore 18
36—dam configured for partial blockage of drain line opening 30
38—hex nut with end ridges configured for securing mounting plate 26 to the perimeter wall of a fluid collection pan 94
40—seal or o-ring configured for placement between hex nut 38 and pan 94
42—plug configured for connection to tailpiece 50 to block fluid flow from pan 94 into a connected drain line
44—ridges
46—end slot in housing 28 through which the distal end 14 of float body 12 extends
48—threads
50—tailpiece of drain line connection assembly 24
52—upwardly-tapering wrap-around sides of mounting plate 26
54—air vents
56—lower chamber of float housing 28
58—slide-on non-metallic cup 58, extends arm 6 for more leverage
60—material-saving cutout areas in encapsulated micro switch 2
62—sealing ribs on encapsulated micro switch 2, preferably added during manufacture
64—protruding alignment guide
66—elongated protrusion on encapsulated micro switch 2 configured for engagement with elongated opening 74 for easy snap-in connection of encapsulated micro switch 2 within the upper chamber 32 of float housing 28
68—representation of micro switch within encapsulated material
70—widened portion of the lower chamber 56 within unitary housing 28 that is configured to accommodate the larger/wider shape of the second preferred embodiment of float body 12 wherein most of the buoyancy of float body 12 is remote from its pivoting fulcrum
72—downwardly widening slot which is located in the front portion of the lower chamber 56 of unitary housing 28
74—elongated opening in housing 28 configured for engagement with the elongated protrusion 66 on encapsulated micro switch 2
76—alignment notch in the wall of upper chamber 32 that is configured for engagement with the alignment guide 64 on encapsulated micro switch 2
78—float cover—typically foam and often has informational markings
80—rigid attachment plate of float housing 28 configured for associating float housing 28 to a fluid-collecting pan 94
82—spring tab connected to attachment plate 80 and box-style attachment member 136 and used for engagement with grooves on rail plate 92
84—top surface of float body 12
86—upright wall of fluid-collecting pan 94
88—slide adjust plate for use in adjusting the distance between small the magnet 10 associated with the arm 6 of encapsulated micro switch 2 and the larger magnet 22 within float body 12, assists in the post-installation testing of float body 12 to confirm its proper operation, and is secured to housing 28 so that end slot 46 or alternative widened end slot 72 is accessible through its closed central slot 142
90—drain connection mount in the third drain line connection assembly having a substantially planar mounting ring configured for association with the drain opening of pan 94 and connection of float housing 28
92—grooved rail plate
94—fluid collecting pan 96—D-ring shaped member of drain connection mount 90
98—upright member use in drain connection mount 90 or on one end of bridge 100, having one open side configured for securely containing attachment plate 80 or the plate-like rear surface of box-style attachment member 136
100—bridge configured for connection between housing 28 and mounting plate 26
102—rotatable quick-release release member configured for firmly fixing attachment plate 80 within upright member 98
104—knurled exterior of rotatable quick-release member 102
106—open center of rotatable quick-release member 102
108—fastener configured for insertion through open center 106 of rotatable quick-release member 102 and used with rotatable quick-release member 102 to firmly fix attachment plate 80 within upright member 98
110—nut with ridged exterior
112—material-saving cutout area on the top front portion of encapsulated micro switch 2
114—distal end (test latch) of magnet cover 118
116—T-shaped slot configured for receipt of attachment plate 80
118—magnet cover associated with the top surface of float body 12
120—hex indentation
122—front channel in housing 28 configured for adjustable vertical positioning of slide adjust plate 88
124—material-saving cutout in top of lower chamber 56
126—alignment protrusions
128—elongated guide rails on the front portion of housing 28 that are configured for retaining slide adjust plate 88 against housing 28
130—non-slip member on slide adjust plate 88 configured for manual vertical adjustment thereof during its installation on unitary housing 28
132—informational markings
134—hole configured for securing pivot pin 34 in its usable position within bore 18
136—box-style attachment member with plate-like rear surface having a spring tab 82
138—stop at bottom of upright member 98 for help in positioning attachment plate 80 within upright member 98 at an optimal height for an intended application
140—enlarged upper piece configured for quick manual release of spring tab 82 and release of attachment plate 80 from upright member 98
142—vertically-extending closed slot centrally through slide adjust plate 88
144—cut-away area on the top front portion of housing 28 that is similar in configuration to the material-saving cutout area 112 on the top front portion of encapsulated micro switch 2
146—retaining mount within float body 12 for placing larger magnet 22 in a fixed position during use
148—elongated bar configured for retaining slide adjust plate 88 within the guide rails 128 on the front portion of housing 28

DETAILED DESCRIPTION OF THE INVENTION

Figure 6:
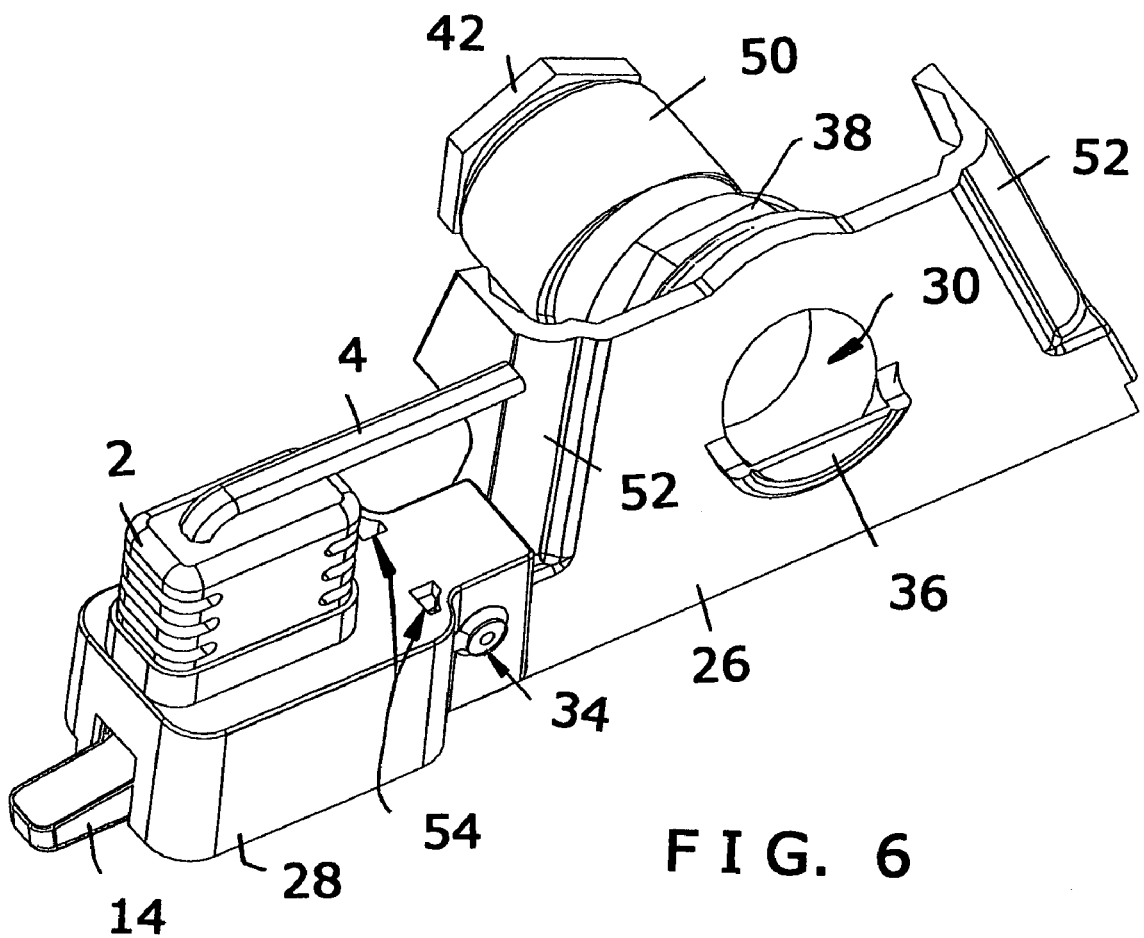
FIG. 6 is a perspective view of all of the components in FIGS. 1-5 in assembled configuration.
Figure 7:
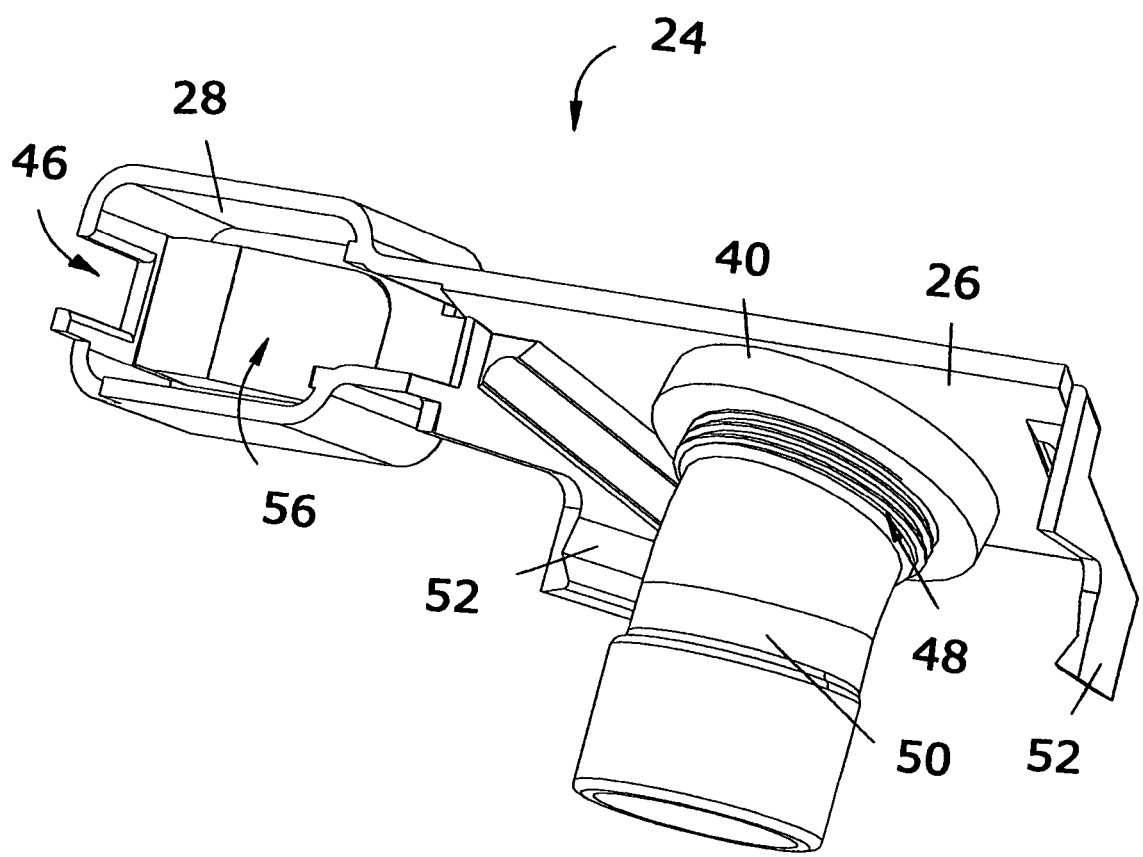
FIG. 7 is a bottom view of the first preferred embodiments of unitary housing and drain connection mounting assembly shown in FIG. 2, with the tailpiece extending away from the mounting assembly, and further showing a more detailed view of the lower chamber of the unitary housing and of the end opening through the lower chamber that allows extension therethrough of the lever-like distal end of the float body.
Figure 23:
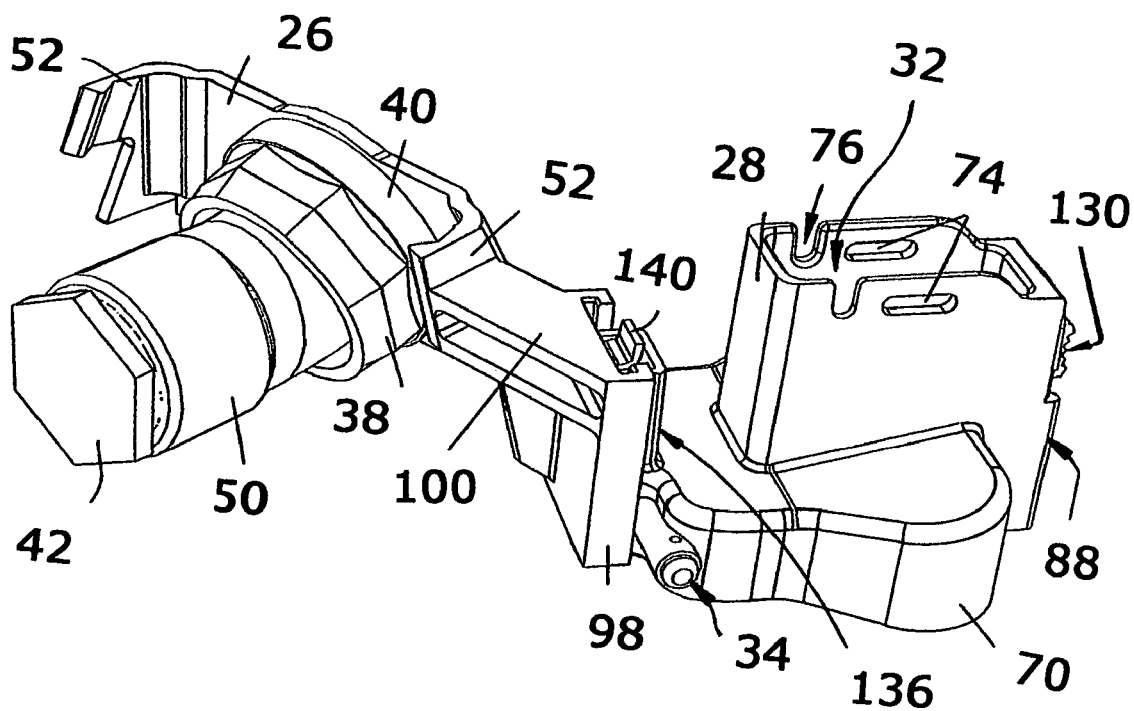
FIG. 23 is a rear view of the third preferred embodiment of present invention unitary float/switch housing detachably secured to a third preferred embodiment of drain connection mounting assembly, one that is configured for positioning over a generally trapezoidal shelf molded into a plastic fluid-collecting pan, has a rail plate for engaging the spring tab on the plate-like rear surface of the box-style attachment member connected to the second and third preferred embodiments of unitary housing, the rail plate depending from one end of a bridge that is secured on its other end to a mounting plate complimentary in configuration to the pan's molded shelf so that the mounting plate and shelf can be securely mated to one another for reliable and reproducible float body deployment.
Figure 25:
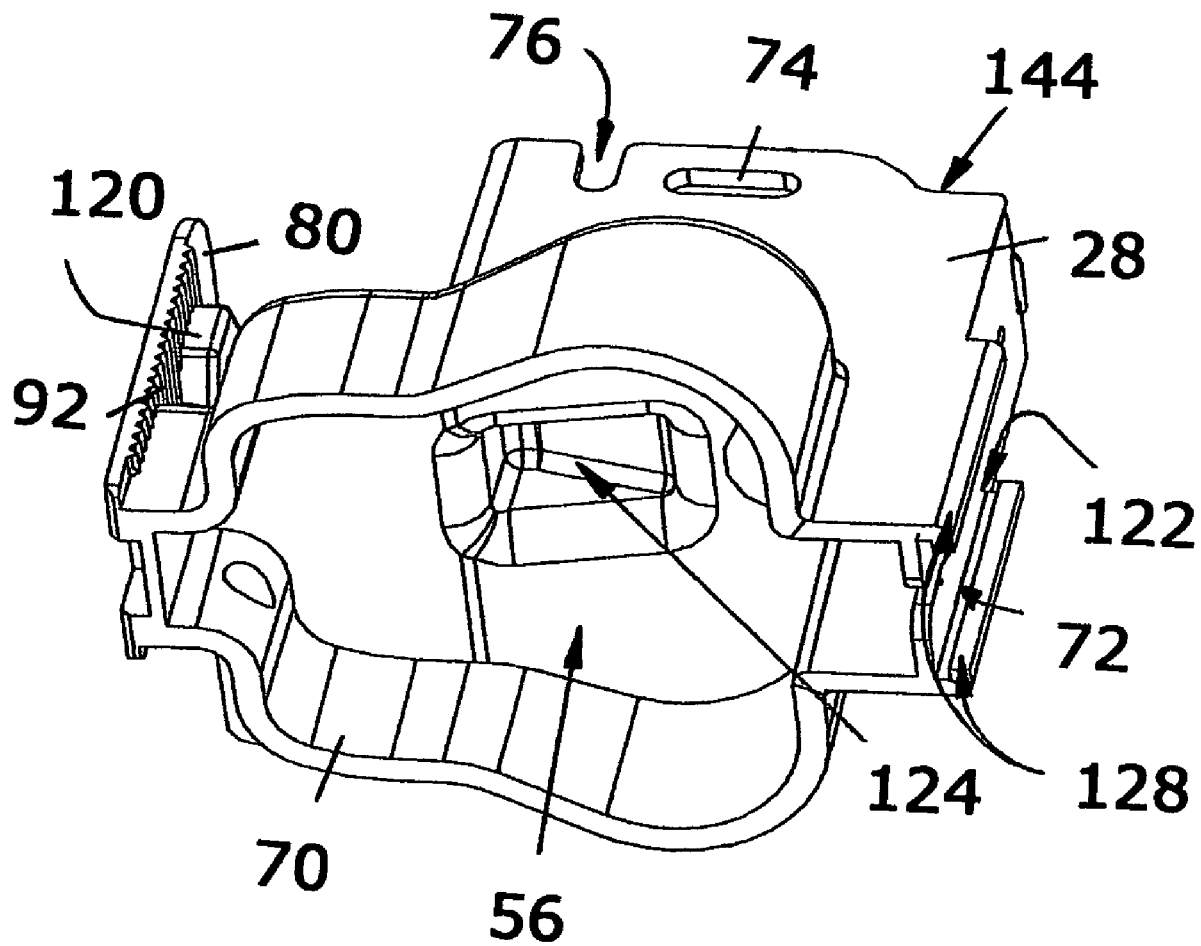
FIG. 25 is a bottom view of the fourth preferred embodiment of unitary housing shown in FIG. 24 that reveals a material-saving cutout in the top surface of the lower chamber which does not provide fluid communicate between the upper and lower chambers of the unitary housing.
Figure 26:
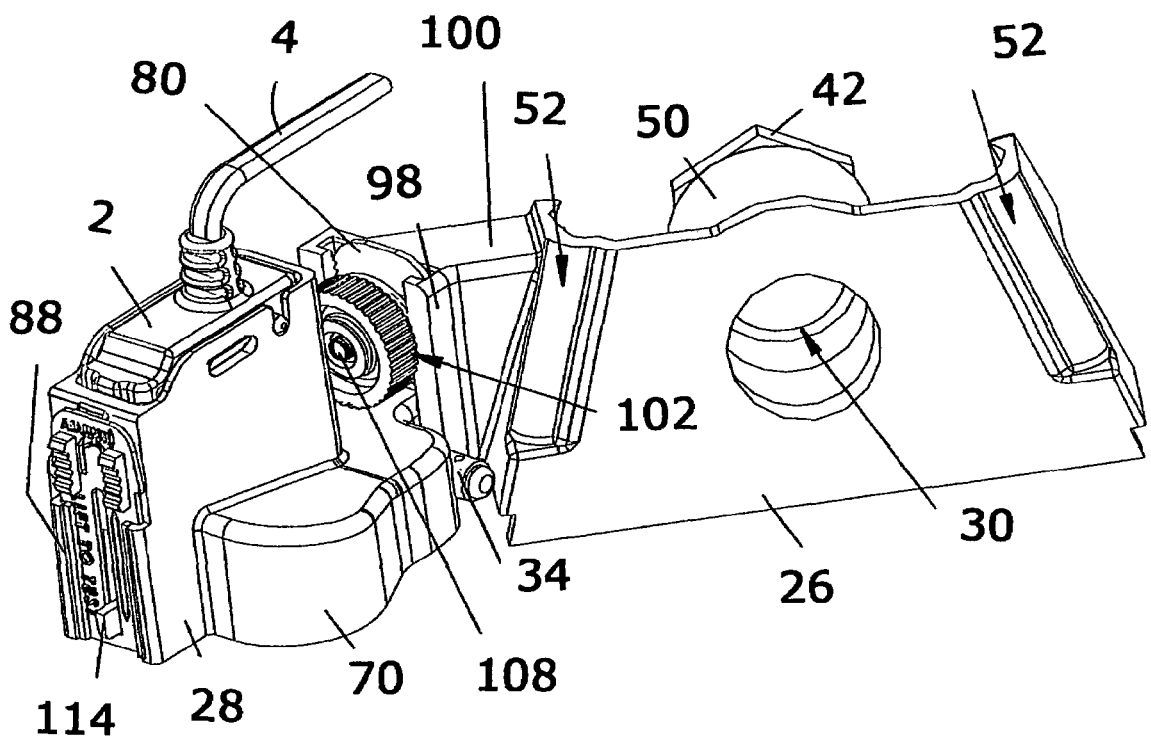
FIG. 26 is a perspective view of the fourth preferred embodiment of unitary housing shown in FIGS. 24 and 25 with its attachment plate secured within the upright member depending from one end of a bridge connected to a mounting plate, with the attachment plate and the upright member each having integrated grooved rail plate surfaces in opposed positions to one another, and further with a rotatable quick-release release member and fastener together tightening the grip between the attachment plate and upright member to firmly fix the unitary housing to the mounting plate.
Figure 27:
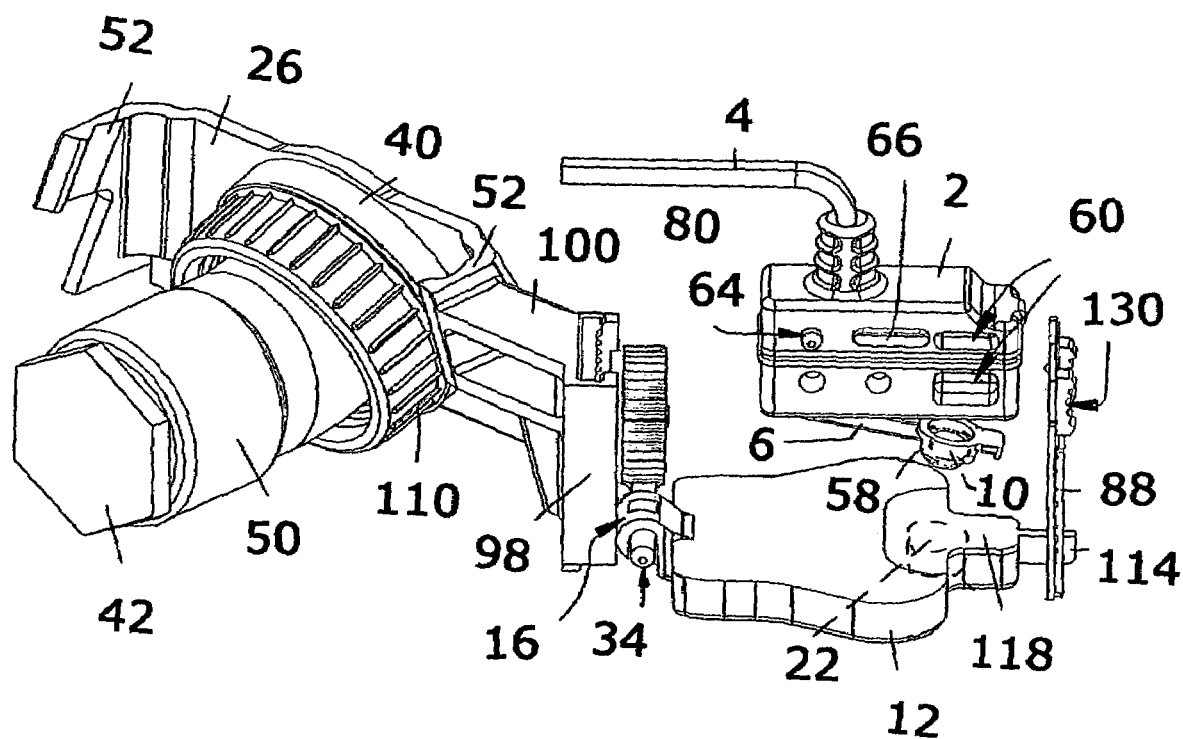
FIG. 27 is a left side view of the present invention structure in FIG. 26 without its unitary housing to reveal the positioning of the smaller permanent magnet on the arm of the encapsulated micro switch above the larger permanent magnet within the float body.
Figure 28:
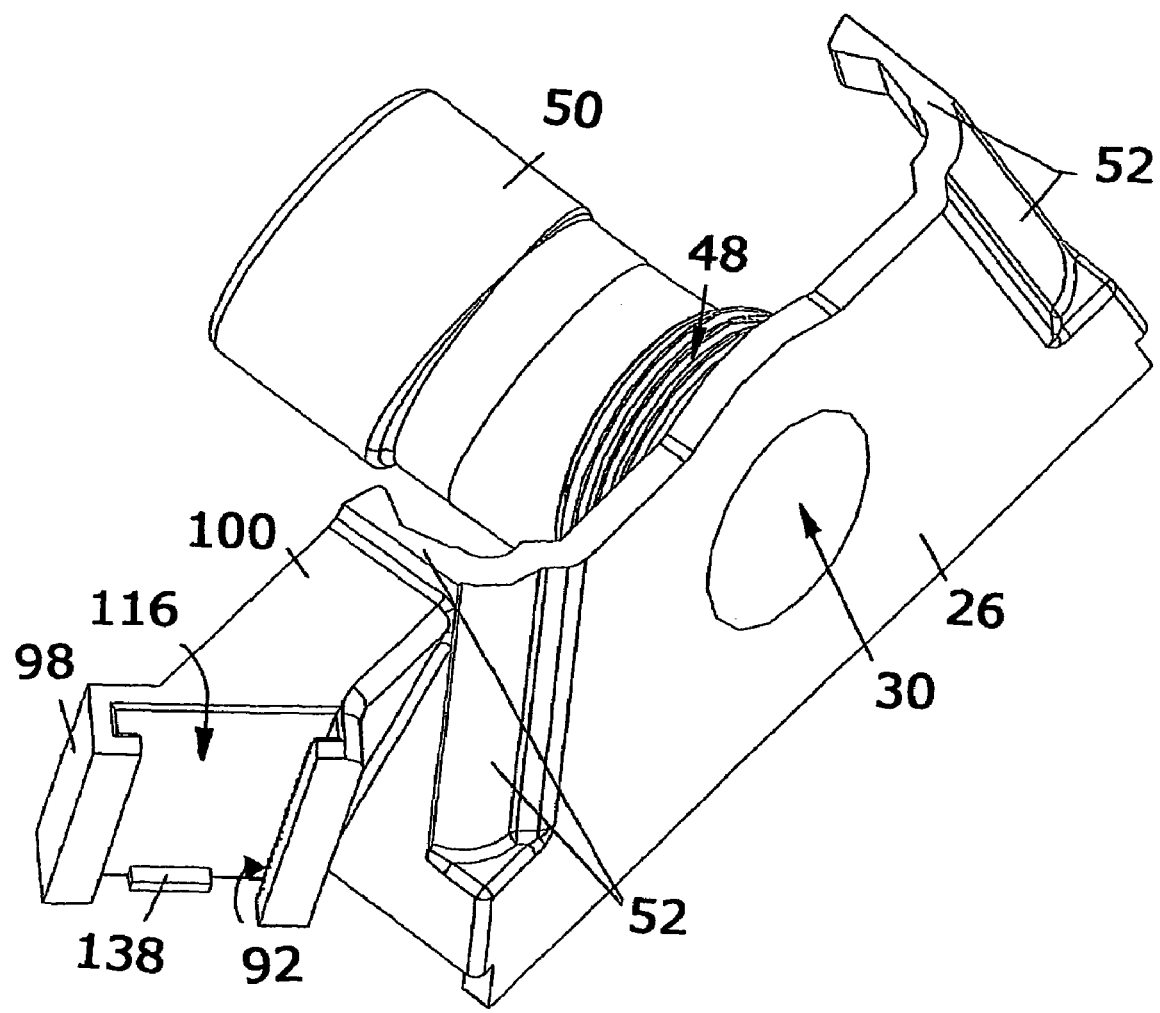
FIG. 28 is a perspective view of the bridge and mounting plate in FIG. 27 with the grooved rail plate structure visible on the interior surfaces of the T-shaped slot within the upright member depending from one end of the bridge.

The present invention comprises a micro switch unit 68 (shown in FIG. 33) encapsulated in waterproof material that makes it corrosion-resistant when placed in or around a fluid environment. When micro switch 68 is encapsulated, it is identified in the accompanying illustrations and the following text by the number 2. In addition, the present invention comprises a float body 12 configured and positioned for upward deployment in response to rising fluid (not shown), wherein when the upward deployment reaches a threshold level no longer considered safe, it causes activation of the micro switch 68 so that it will send a shut-off signal to the system or unit (not shown) producing the fluid posing a risk of damage to its surroundings. To place the encapsulated micro switch 2 in proper relation to the float body for such activation, the present invention also comprises a unitary switch/float housing 28 configured with two vertically-stacked chambers, an upper chamber 32 with an open top configured to receive the encapsulated micro switch 2 and an open-bottomed lower chamber 56 configured to receive the float body 12. Since unitary housing 28 is configured with no fluid communication between upper chamber 32 and lower chamber 56, when encapsulated micro switch 2 and float body 12 are respectively positioned therein, each is physically isolated from the other. Therefore, in order for the upwardly deployable float body 12 to activate encapsulated micro switch 2, magnets are used. The small magnet 10 associated with the non-magnetic lever-like arm 6 connected to encapsulated micro switch 2 is preferably smaller in size than the larger magnet 22 enclosed within the distal end of float body 12. Four unitary housings 28 are discussed in the following disclosure, a first preferred embodiment shown in FIGS. 2, 6, and 7, a second preferred embodiment shown in FIGS. 9-11, a third preferred embodiment shown in FIGS. 14-19, and 23, and a fourth shown in FIGS. 24-27. In addition, the following disclosure contains reference to four preferred embodiments of drain line connection assemblies for stable mounting of the unitary housing in a fixed location that assist in rapid and secure attachment of the present invention encapsulated micro switch 2 and float body 12 in optimal positions for prompt and reliable shut-off signal generation, typically to the upright perimeter wall of a fluid collecting container, such as but not limited to the condensate collection pan 94 shown in FIG. 15. As their name implies, the drain line connection assemblies used as examples herein of preferred mounting structure for the present invention unitary housing, encapsulated micro switch 2, and float body 12, also typically provide a means for connecting the fluid collecting container to a drain line. A first preferred embodiment of a drain line connection assembly is shown in FIGS. 2, 6, and 7, a second preferred embodiment is shown in FIGS. 15-21, a third preferred embodiment is shown in FIG. 23, and a fourth preferred embodiment is shown in FIGS. 26-28.

Many of the preferred embodiments of unitary housing 28, encapsulated micro switch 2, float body 12, and drain line connection assemblies (that include mounting plate with wrap-around sides 26, drain connection mount 90, mounting plate 26 with bridge 100, and the upright members with their front or back grooved rail plate surfaces 92), which are identified hereinabove and in the accompanying illustrations, can be manufactured with little or no modification for interchangeable use with one another in a variety of configurations. Thus, the preferred embodiments disclosed herein are provided only as examples, and should not be considered patentably distinct from one another. Instead, they are merely provided to identify the more important features of the present invention, and it is to be understood that the present invention is capable of having other embodiments and of being practiced and carried out in a variety of other ways. Further, the language employed herein is for the purpose of description and should always be interpreted broadly, rather than being considered as limiting. Thus, the claims appended herein should be regarded as including a multitude of equivalent constructions insofar as they do not depart from the spirit and scope of the present invention.

Figure 12:
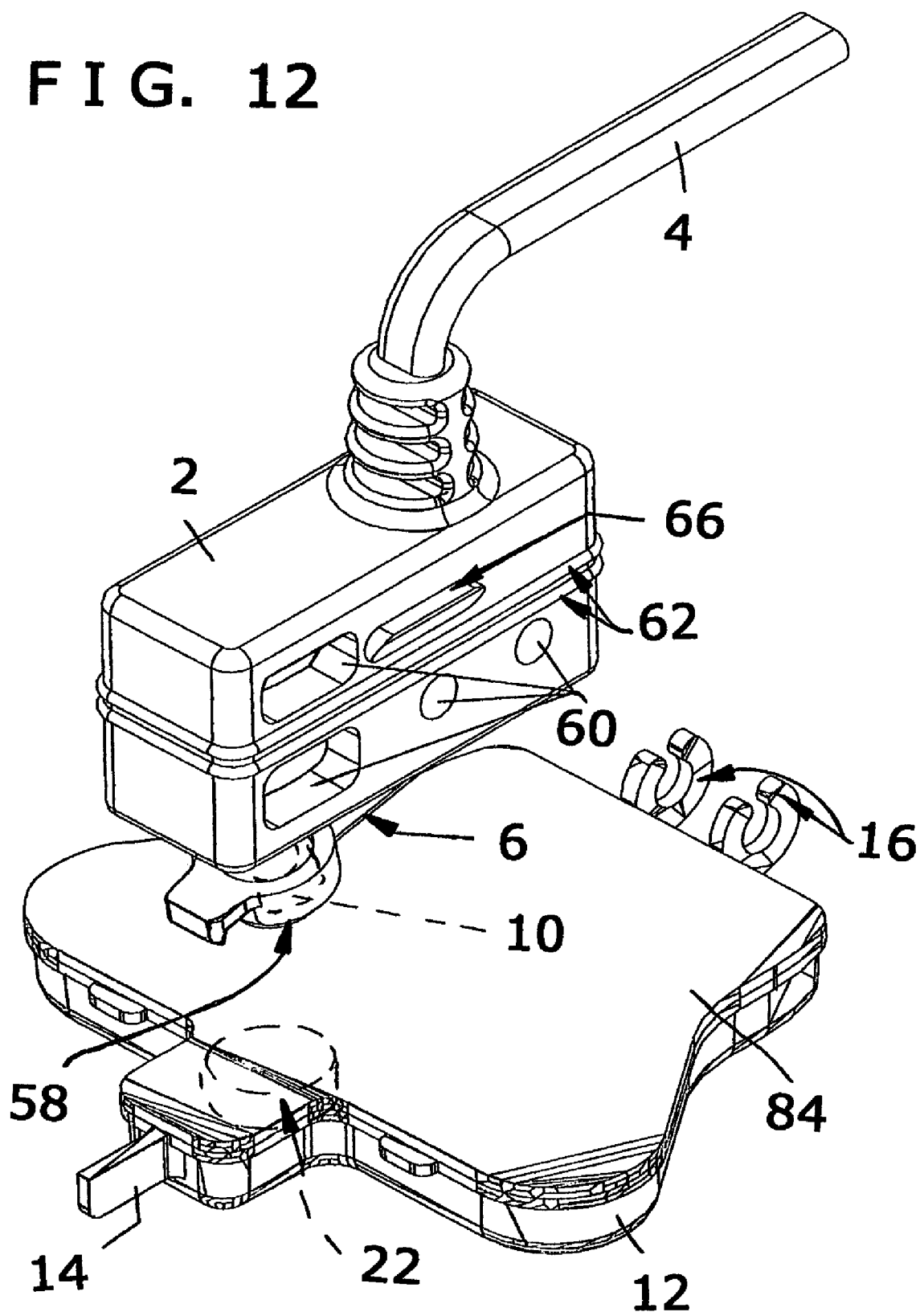
FIG. 12 is a perspective view of the second preferred embodiment of encapsulated micro switch in FIG. 8 positioned over a preferred configuration of float body that can be used with the second preferred embodiment of unitary housing shown in FIGS. 9-11, with the micro switch arm maintaining a small permanent magnet above the larger permanent magnet positioned with the pivoting float body adjacent to its lever-like distal end.

FIGS. 1-7 show a first preferred embodiment of the encapsulated micro switch 2, a first preferred embodiment of unitary float/switch housing 28 with an upper chamber 32 isolated from its lower chamber 56, and a first preferred embodiment of drain line connection assembly having a mounting plate 26. FIG. 1 is shows encapsulated micro switch 2 with its external non-magnetic lever-like arm 6 carrying a small magnet 10 close to its distal end in a cup 8. Arm 6 is shown extending downwardly from the main body of encapsulated micro switch 2, with cup 8 positioned below arm 6. The size and shape of cup 8 is not critical, as long as it has sufficient interior space to hold magnet 10. Preferably cup 8 is made from non-magnetic materials. The size and shape of magnet 10 is also not critical, nor is the configuration or dimension of arm 6 as long as arm 6 positions small magnet 10 in the proper location relative to the larger magnet 22 housed within float body 12 for prompt and reliable shut-off signal generation. In FIG. 1 the number 20 represents the top of a hollow area or other designated space within float body 12 where larger magnet 22 is fixed in position for interaction with the smaller magnet 10 associated with arm 6. Although not shown, bonding agents may be used to secure larger magnet 22 within hollow area 20. FIG. 1 also shows electrical wiring 4 extending upwardly from the top surface of encapsulated micro switch 2 for use in connecting encapsulated micro switch 2 to a fluid-producing unit or system (not shown), so that unit or system may receive a shut-off signal from the encapsulated micro switch 2 when a sufficient amount of fluid therefrom collects and poses a risk of damage to the unit/system or surroundings. FIG. 1 further shows a float body 12 located under encapsulated micro switch 2 in a position that allows the larger magnet 22 within float body 12 to interact with the smaller magnet 10 when the distal end 14 of the pivoting float body 12 is vertically deployed in response to rising fluid level beyond a predetermined threshold level considered safe. Distal end 14 is preferably hollow to enhance buoyancy. An installer (not shown) mounts the unitary housing at the proper elevation so that signal generation by encapsulated micro switch 2 occurs when the threshold level of collected fluid considered safe in the application is either met or exceeded. Both of the magnets 10 and 22 are shown in broken lines, as each would otherwise be hidden from view. Further, broken lines marked by the numerical designation of 12*b* show float body 12 in a lower pre-deployment position, while solid lines marked by the numerical designation of 12*a* show float body 12 in an at least partially deployed position. The double-headed arrow to the right of the lever-like distal end 14 of float body 12 shows its expected direction of movement during deployment and reset. FIG. 1 also shows the proximal end 16 of float body 12 that provides for its pivotal connection to mounting plate 26 (see FIG. 6) via pivot pin 34, and the bore 18 extending through proximal end 16 that is used for insertion of a pivot pin 34 (such as but not limited to that shown in FIGS. 6 and 32). As can be seen in FIG. 32, it is preferred for pivot pin 34 to have a position-locking configuration that with a clip or other common fastener (not shown) helps to maintain it within bore 18 for reliable and long term deployment of float body 12 without malfunction. The shape of float body 12 shown in FIG. 1 is not considered limiting and other shapes are also usable with the present invention, such as but not limited to the float body 12 having an arcuate perimeter that is shown in FIG. 12. It is preferred that float body 12 have a configuration that allows it to promptly deploy as a result of contact with a very small amount of collected fluid, and for float body to substantially fill lower chamber 56.

Figure 2:
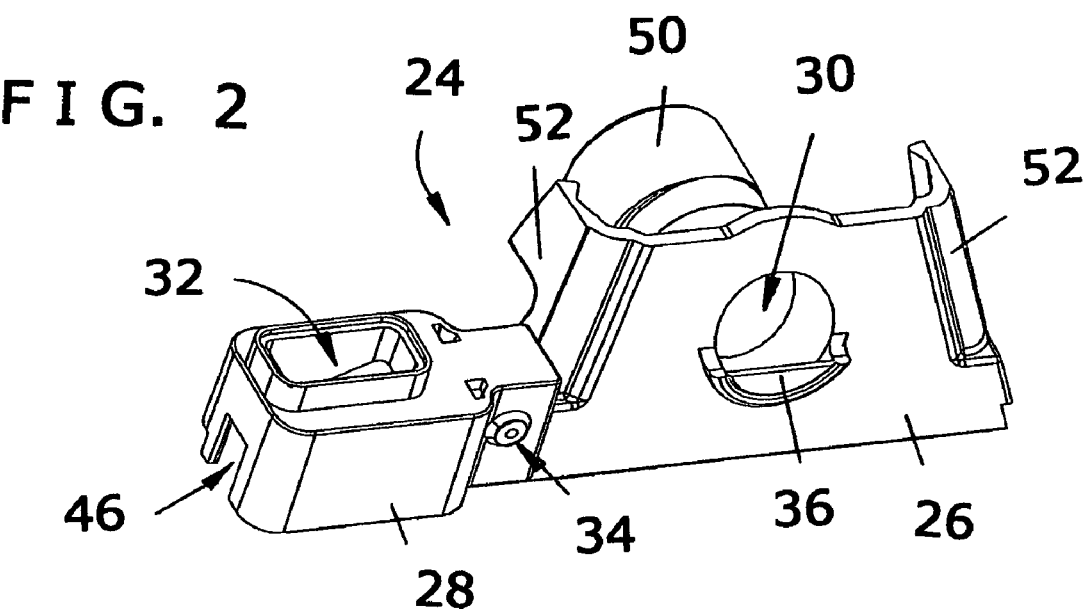
FIG. 2 is a perspective view of a first preferred embodiment of a present invention unitary float/switch housing connected to a first preferred embodiment of drain connection mounting assembly, both of which can be used with the micro switch and float body shown in FIG. 1, with the first preferred embodiment of drain connection mounting assembly having a mounting plate configured for mating with a molded shelf on a fluid collection pan and also having a removable tailpiece extending rearwardly from the mounting plate that is used for connection of a drain line to the fluid collection pan.

FIG. 2 shows the first preferred embodiment of unitary housing 28 in the present invention connected via a pivot pin 34 to the mounting plate 26 of a first preferred embodiment 24 of a drain line connection assembly. Both are contemplated for use with the encapsulated micro switch 2 and float body 12 shown in FIG. 1. The wide top opening of upper chamber 32 is visible, as is the opening/slot 46 through which the lever-like distal end 14 of float body 12 extends for use in testing and resetting float body 12 after deployment into proper position for reuse. Although the size of unitary housing 28 can vary, for cost effective manufacture it is not contemplated for unitary housing 28 to be much larger than minimally needed for containing encapsulated micro switch 2 and float body 12 in their proper positions for effective and reliable shut-off signal generation. Not marked in FIG. 2, but marked by the number 54 in FIG. 6, FIGS. 2 and 6 show two air vents through the top surface of unitary housing 28 that exhaust air as float body 12 deploys, preventing airlock malfunction. FIG. 2 further shows the first preferred embodiment 24 of a drain line connection assembly having upwardly-tapering wrap-around sides 52 that are configured for mating with a shelf (not shown in this disclosure but visible in other patented products of the inventor herein) molded into the perimeter wall of a fluid collection container. The upwardly-tapering wrap-around sides 52 create a generally trapezoidal configuration, and when the shelf molded into the fluid collection container to which mounting plate 26 is mated has a complementary trapezoidal configuration, the unitary housing 28 with its encapsulated micro switch 2 pre-positioned within upper chamber 32 and float body 12 pre-positioned within lower chamber 56 is automatically leveled relative to the container, so when the container is leveled after present invention installation, float body 12 becomes leveled for proper and reliable deployment without further installer action. FIG. 2 also shows mounting plate having a dam 36 for raising the depth of fluid collection before its discharge through opening 30 can occur. Dam 36 can be made of breakaway construction, so that an installer has two discharge options and can select the one best suited to the individual application. In addition, FIG. 1 shows a tailpiece 50 aligned with opening 30 and rearwardly extending from mounting plate 26. When tailpiece 50 is connected to a drain line (not shown), it can be used to assist in the discharge of collected fluid from the fluid collection container associated with the present invention should non-routine events occur that lead to rapid and/or excessive fluid collection that would otherwise place surroundings at risk for damage.

Figure 3:
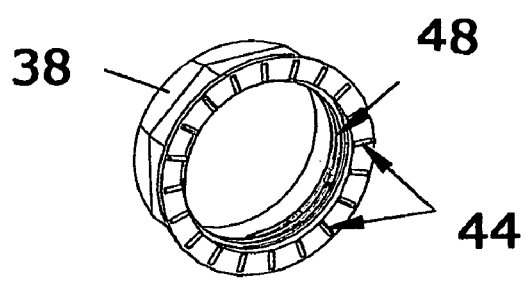
FIG. 3 is a perspective view of a preferred embodiment of nut used in the first preferred embodiment of a present invention to assist in securing the unitary housing and drain connection mounting assembly in FIG. 2 to the perimeter wall of a fluid collection pan, such as that shown in FIG. 14, with placement of the nut contemplated between the tailpiece and the mounting plate as shown in FIG. 6.
Figure 4:
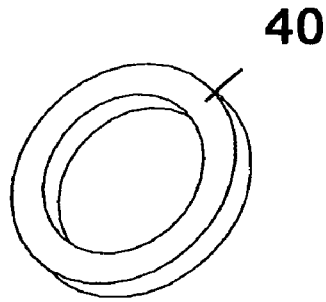
FIG. 4 is a perspective view of a preferred embodiment of O-ring, washer, or other seal used in the first preferred embodiment of a present invention between the nut in FIG. 3 and the perimeter wall of a fluid collection pan.
Figure 5:
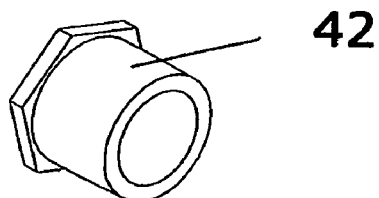
FIG. 5 is a perspective view of a preferred embodiment of plug used in the first preferred embodiment of a present invention to temporarily seal the rearwardly-extending tailpiece, as shown in FIG. 6.

FIGS. 3-5 show components used in association with tailpiece 50 and for securely fixing mounting plate 26 in its usable position against the perimeter wall of a fluid collection container. FIG. 3 shows a hex nut 38 with female threads 48 used on the outside of a fluid collection container for connection with male threads 48 (seen in FIG. 7) extending rearwardly from mounting plate 26. As hex nut 38 is tightened, the perimeter wall of the fluid collection container becomes sandwiched between the rear surface of mounting plate 26 and hex nut 38. To prevent leaks around the opening in the fluid collection pan through which the connection of hex nut 38 to mounting plate 26 is made, an O-ring, washer, or other seal 40 is used, similar to that shown in FIG. 4. Seal 40 is also shown in FIG. 7 against the back surface of mounting plate 26, with sufficient threads 48 still exposed to allow the connection of hex nut 38 that will establish a secure connection between mounting plate 26 and the perimeter wall of the fluid collection pan when hex nut 38 is tightened. FIG. 5 shows a first preferred embodiment of plug 42 that can be used to prevent discharge of fluid from a collection pan having an opening but no nearby drain line, and where positioning of the fluid collection pan is also not appropriate for overflow into the surrounding area. Plug 42 can be used to temporarily seal tailpiece 50, or bonded or otherwise secured to tailpiece 50 to provide a permanent connection thereto. FIG. 6 shows all of the components in FIGS. 1-5 in assembled configuration, with encapsulated micro switch 2 inserted through the top opening of upper chamber 32 and the lever-like distal end 14 of float 12 extending through the slot 46 of unitary housing 28. Air vents 54 and electrical wiring 4 are also shown in FIG. 6. FIG. 7 shows a bottom view of the first preferred embodiment 24 of a drain line connection assembly with its mounting plate 26 having wrap-around sides 52 and unitary housing 28 having lower chamber 56 and end slot 46. FIG. 7 shows lower chamber 56 having an open-bottomed configuration, and no opening between it and the adjacent upper chamber 32 (which is not visible in FIG. 7).

Figure 18:
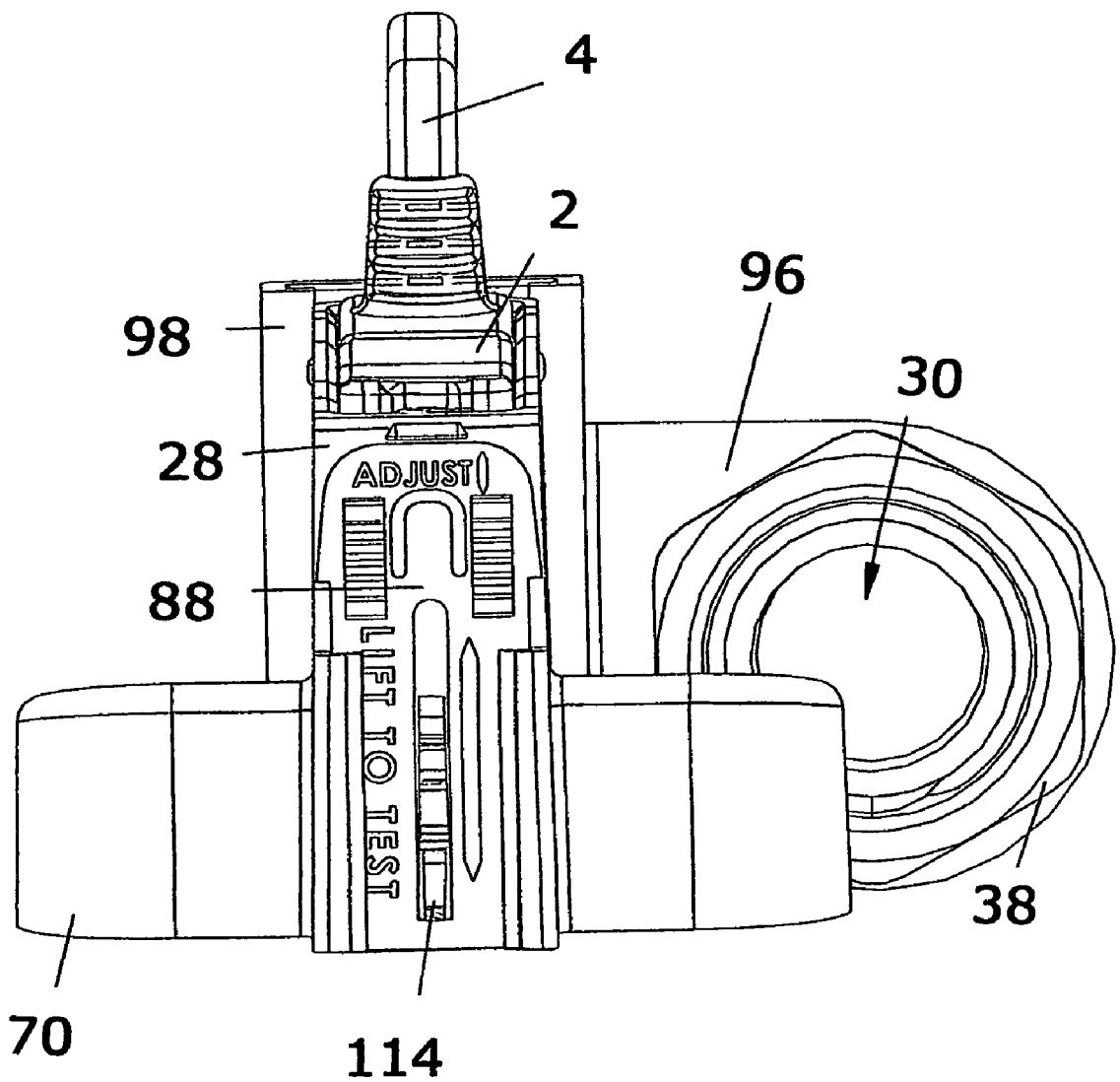
FIG. 18 is a front view of the third preferred embodiment of unitary housing and the second preferred embodiment of drain connection mounting assembly shown in FIG. 15 that reveals the float body in its non-deployed position.
Figure 19:
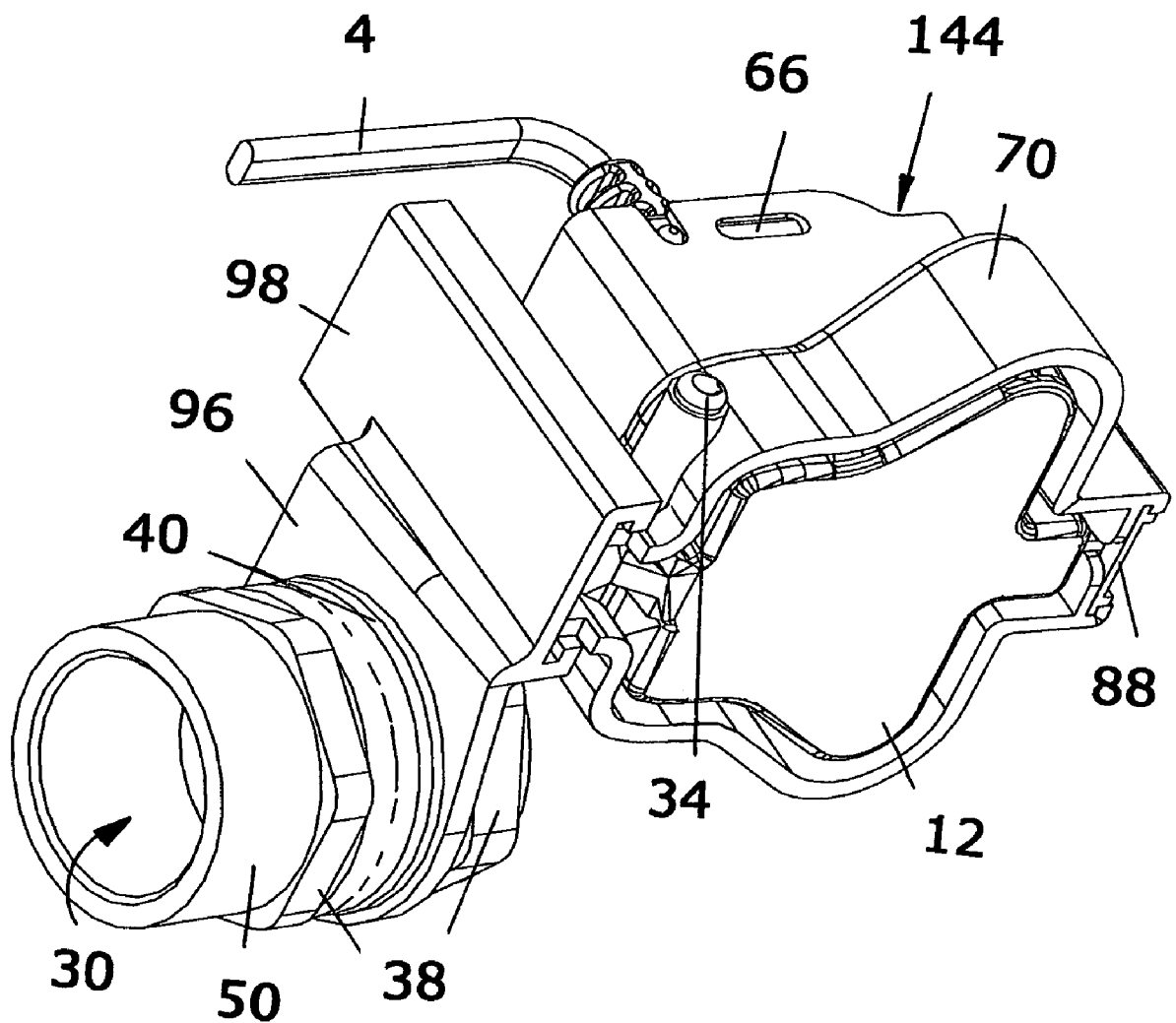
FIG. 19 is a bottom view of the third preferred embodiment of unitary housing and the second preferred embodiment of drain connection mounting assembly shown in FIG. 15 with the float body substantially filling the lower chamber and the drain connection mount secured between the unitary housing and the tailpiece.
Figure 20:
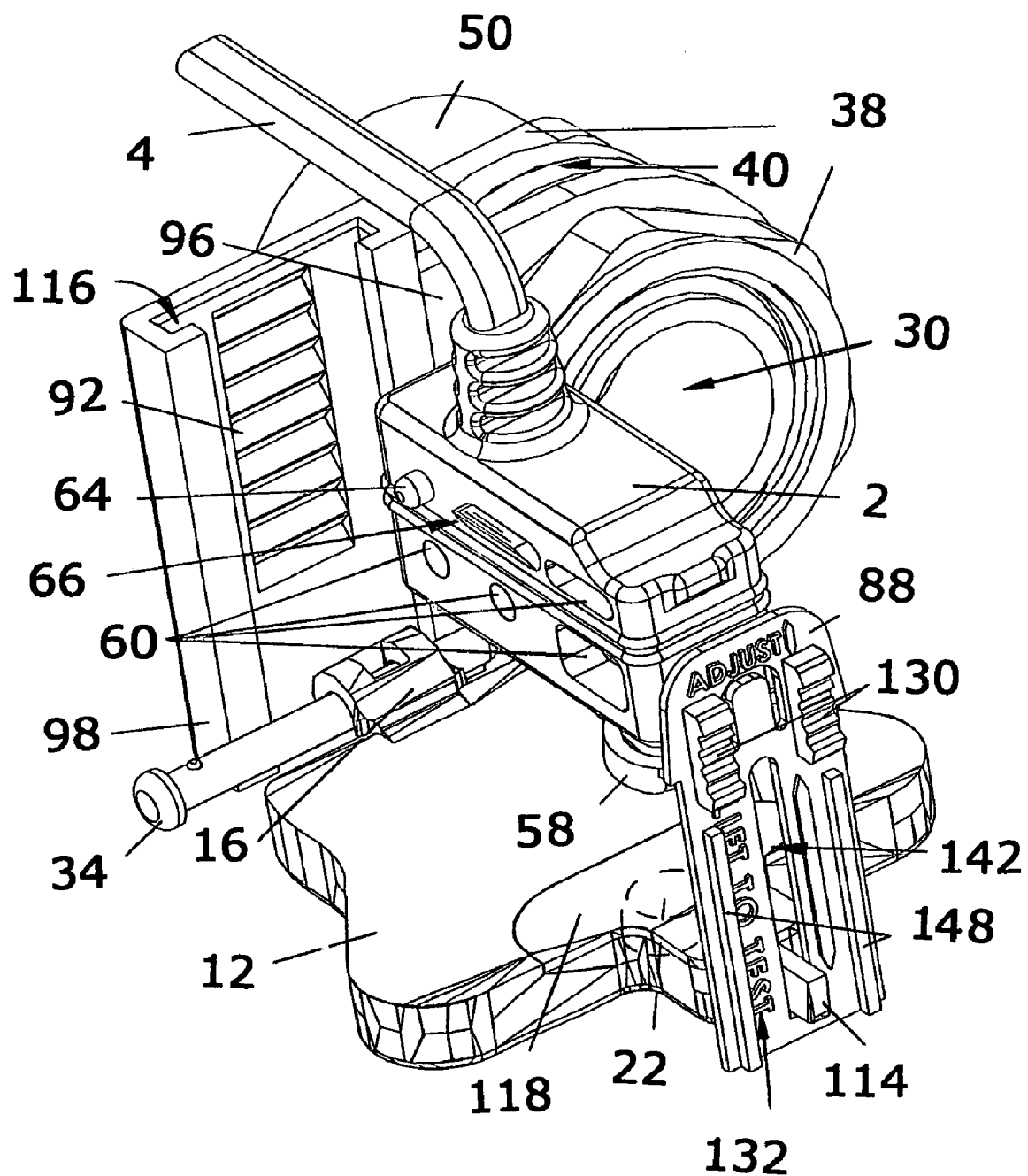
FIG. 20 is an exploded view of all components shown in FIGS. 15-19 except the unitary housing and small magnet.
Figure 21:
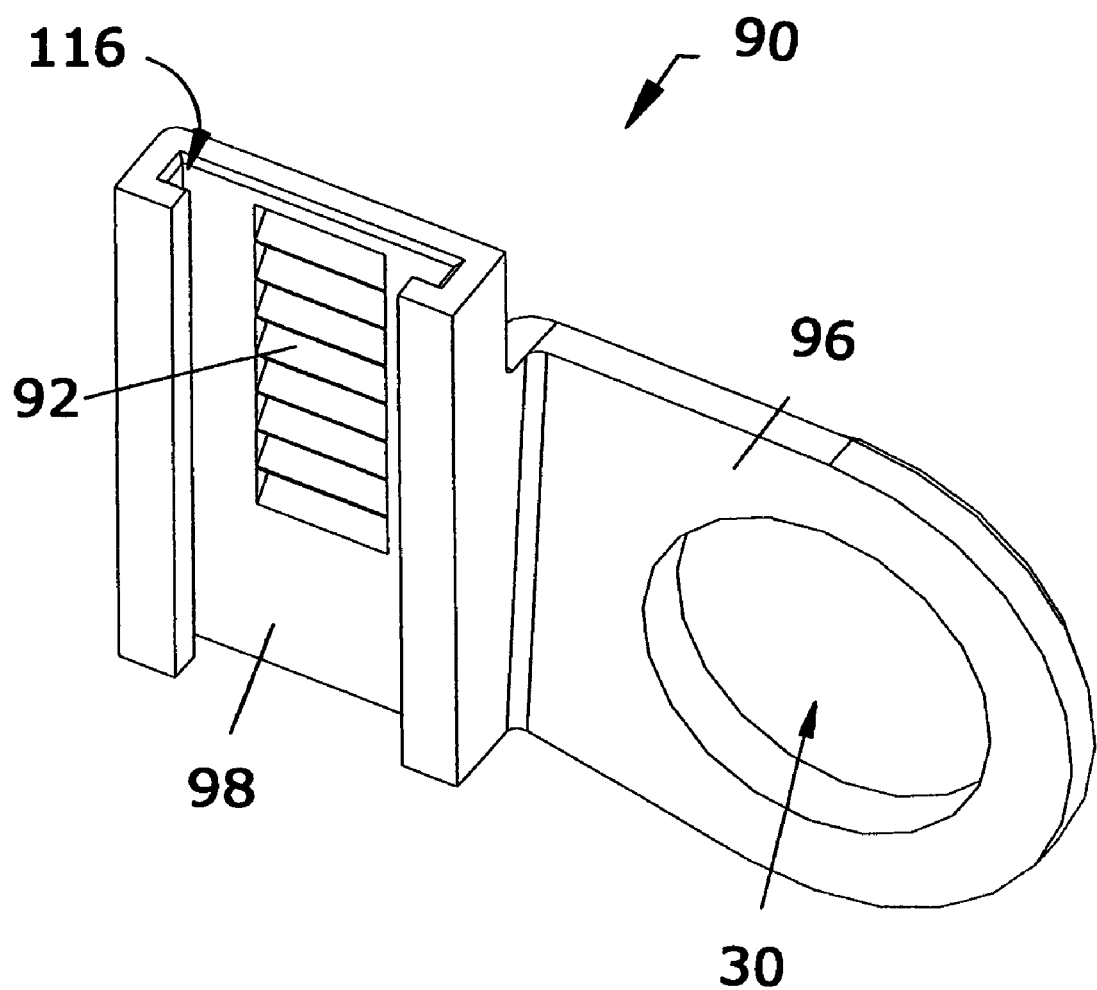
FIG. 21 is a perspective view of the drain connection mount in the second preferred embodiment of drain connection mounting assembly shown in FIG. 15, with its rail plate and drain line opening, which is usable with second and third preferred embodiments of unitary housing.

FIGS. 8-13 show second preferred embodiments of the encapsulated micro switch 2, float body 12, and unitary float/switch housing 28, while FIGS. 14-20, 22-23, and 33 show third preferred embodiments of the encapsulated micro switch 2 and unitary float/switch housing 28. FIGS. 21 and 23 respectively show second and third preferred embodiments of drain line connection assemblies. The third preferred embodiment of unitary housing 28 differs from the second preferred embodiment primarily in its upper body structure (cutout area 144 on the front top end vs a housing 28 of uniform height) and the means of attachment used to secure it to a drain line connection assembly (attachment plate 80 vs box-style attachment member with plate-like rear surface). The second and third first preferred embodiments both can be connected to the perimeter wall of a fluid collection pan via the drain line mount 90 shown in FIG. 21 or via the mounting plate 26 and bridge 100 shown in FIG. 23. A fourth preferred embodiment of unitary float/switch housing 28 is shown in FIGS. 24-27. It differs from the second and third preferred embodiments in that it combines the grooved rail plate structure 92 of the upright member 98 used for connection of the second and third preferred embodiments with the attachment plate 80 of the second preferred embodiment, and then adds a fastener. Thus, a different drain line connection assembly (seen in FIGS. 26 and 27) is needed for securing it to a fluid collection pan, one having an upright member with complementary grooved rail plate structure 92 adjacent to the front part of its T-shaped slot 116, rather than on the rear interior surface of T-shaped slot 116 (as is shown in FIGS. 20 and 21).

Figure 8:
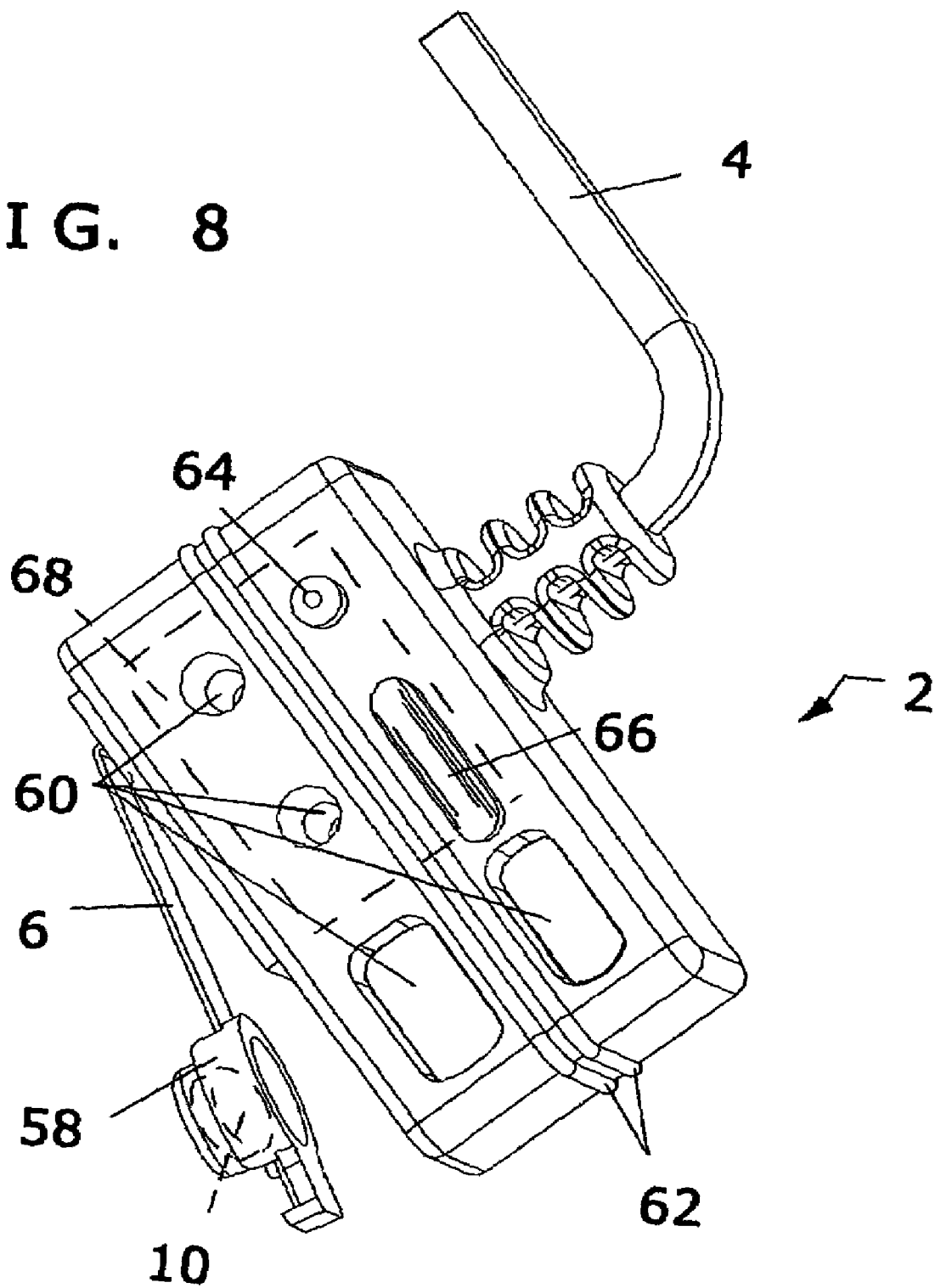
FIG. 8 is an enlarged view of a second preferred embodiment of encapsulated micro switch used in the present invention to create a shut-off signal to stop fluid production when collected fluid monitored by an associated float body indicates that threshold fluid levels considered safe have been exceeded, which includes opposed snap-in protrusions for secure positioning of the micro switch within the upper chamber of the unitary float/switch housing, an alignment guide adapted for easy micro switch positioning within the upper chamber of the float housing to prevent entry of fluid into the upper chamber from above, several material-saving and cost-reducing cutout areas, dual ribs that provide a watertight seal with the upper chamber of the unitary housing, and a slide-on cup extension that lengthens the micro switch arm.
Figure 11:
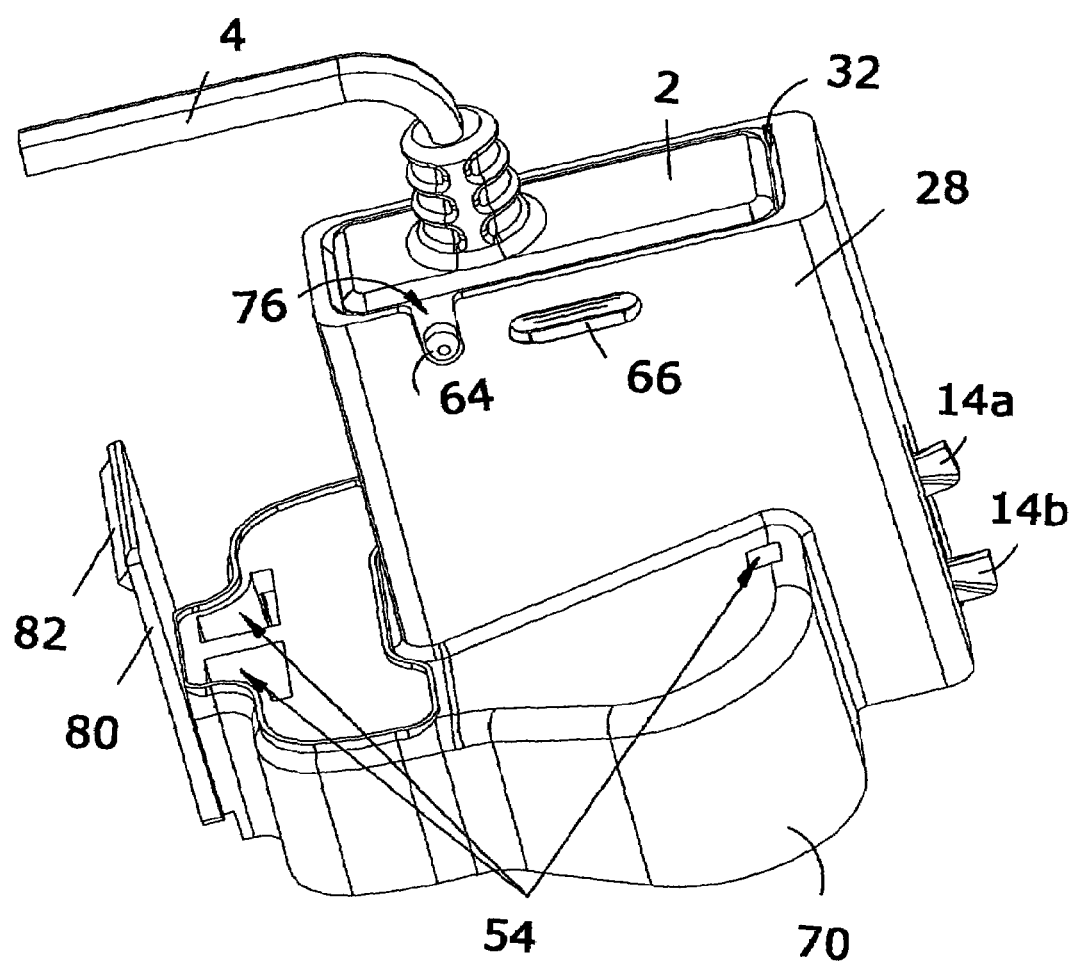
FIG. 11 is a left side view of the second preferred embodiment of unitary housing in FIG. 9 shown with its label/cover removed to expose air vent openings, the alignment guide mated with a vertically-extending alignment slot in the upper chamber, the lever-like end of the float body shown in a lowered pre-deployment position as well as a raised post-deployment (or test) position, and a vertically-extending spring tab on an attachment plate connected to the outside surface of the lower chamber in a position remote from the narrow/thin slot.

FIG. 8 is an enlarged view of the second preferred embodiment of encapsulated micro switch 2 used in the present invention to create a shut-off signal to stop fluid production when collected fluid monitored by an associated float body 12 indicates that threshold fluid levels considered safe have been exceeded. FIG. 8 shows the second preferred embodiment of encapsulated micro switch 2 having a substantially rectangular configuration and a snap-in protrusion 66 on its upper half, above its sealing ribs 62. FIG. 12 shows an opposed snap-in protrusion 66 on the upper half of the opposed side of encapsulated micro switch 2. The opposed snap-in protrusions 66 allow for secure positioning of the encapsulated micro switch 2 within the upper chamber 32 of the unitary housing 28, and resistance against premature and/or inadvertent removal of encapsulated micro switch 2 from upper chamber 32. FIG. 8 also shows the second preferred embodiment of encapsulated micro switch 2 having an alignment guide 64, which in FIG. 11 is shown extending through an alignment slot 76 in the wall of the upper portion of unitary housing 28. Alignment guide 64 is used for fast and easy installer positioning of encapsulated micro switch 2 within upper chamber 32. For comparison purposes, one should note that the third preferred embodiment of encapsulated micro switch 2 (shown in FIGS. 26 and 27) has two opposed alignment guides 64, for engagement with the two vertically-extending alignment slots 76 shown in the top edges of the third and fourth preferred embodiments of unitary housing 28 (shown respectively in FIGS. 23 and 24). Also, when compared to the first preferred embodiment of encapsulated micro switch 2 shown in FIG. 1, the length of the second preferred embodiment appears to have a greater length dimension. This added dimension is used for simpler and more cost effective construction of unitary housing 28 when a larger lower chamber 56 is needed to accommodate a larger float body 12 with greater buoyancy (such as that shown in FIG. 12) that can achieve an even faster fluid shut-off response than is possible with the first preferred embodiment of float switch 12 shown in FIG. 1. In addition, by looking at the positioning of electrical wiring 4 in FIG. 1, one can see that the micro switch 68 within the first preferred embodiment of encapsulated micro switch 2 substantially fills the defined perimeter therein for encapsulated micro switch 2, whereas the generally rectangular perimeter of the micro switch 68 in the second preferred embodiment of micro switch 2 in FIG. 8 is drawn with broken lines in FIG. 8 below electrical wiring 4, and one can see that the perimeter of additional encapsulation extends forwardly from the forward edge of micro switch 68. As further shown in FIG. 8, the bottom portion (which may also be covered by corrosion-resistant material) of the micro switch 68 (to which arm 6 is connected) extends below the remainder of encapsulated micro switch 2, visually confirming that the micro switch 68 within it does not occupy the entire interior portion of encapsulated micro switch 2. Thus, since the forward portion of the second preferred embodiment of encapsulated micro switch 2 is substantially needed as filler material for secure positioning of encapsulated micro switch 2 within the upper chamber 32 of a unitary housing 28 configured for a larger float body 12 than the one identified in the first preferred embodiment of float body 12 disclosed herein and shown in FIG. 1, FIG. 8 shows several material-saving and cost-reducing cutout areas 60 shown on the side of the second preferred embodiment of encapsulated micro switch 2. FIG. 12 shows similarly configured and positioned cutout areas 60 on the opposed side of encapsulated micro switch 2. Some of the cutout areas 60 may extend through the full width of encapsulated micro switch 2, however, the ones adjacent to micro switch 68 would not. The size, number, location, spaced-apart distances from one to the other, and perimeter configuration of cutout areas 60 may be different from that shown. It is only critical that cutout areas 60 be formed to the extent that they provide material benefit without causing any structural deficiency. FIG. 8 also shows the arm 6 extending below encapsulated micro switch 2 having a non-metallic slide-on cup extension 58 that lengthens arm 6 so that the small magnet 10 within cup 58 can be appropriately positioned to interact with the larger magnet 22 placed near the distal end of the larger float body 12 shown in FIG. 12. Finally, FIG. 8 shows horizontally-extending dual ribs 62 centrally around encapsulated micro switch 2, which provide a watertight seal for the top opening of upper chamber 32 to prevent the entry of fluid into upper chamber 32 from above.

Figure 9:
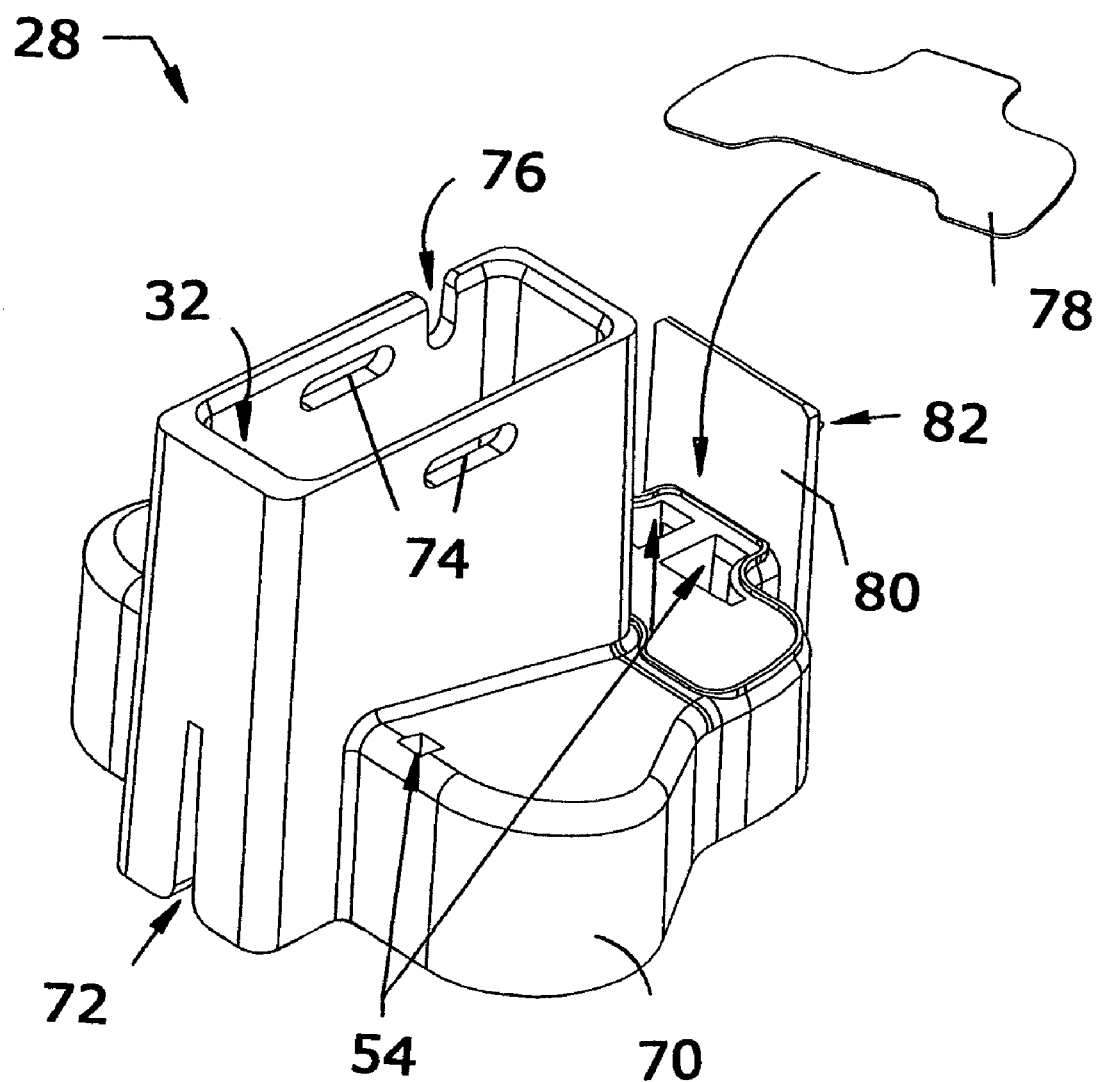
FIG. 9 is an exploded view of a second preferred embodiment of unitary float/switch housing in the present invention that can be used with the second preferred embodiment of encapsulated micro switch shown in FIG. 8, and also used with the second preferred embodiment of drain connection mounting assembly shown in FIG. 15, with the upper chamber of the unitary housing having structure configured to engage the opposed alignment guides and snap-in protrusions on the encapsulated micro switch shown in FIG. 8, a widened lower chamber, the lower chamber having a narrow/thin vertically-extending slot for guiding the vertical deployment of the lever-like distal end of the float body, a vertically-extending spring tab on an attachment plate connected to the outside surface of the lower chamber in a position remote from the narrow/thin slot, and a label or other covering material removed to show vent openings that help to prevent float body airlock malfunction, thereby assuring repeat and reliable float body deployment in response to rising fluid levels.
Figure 10:
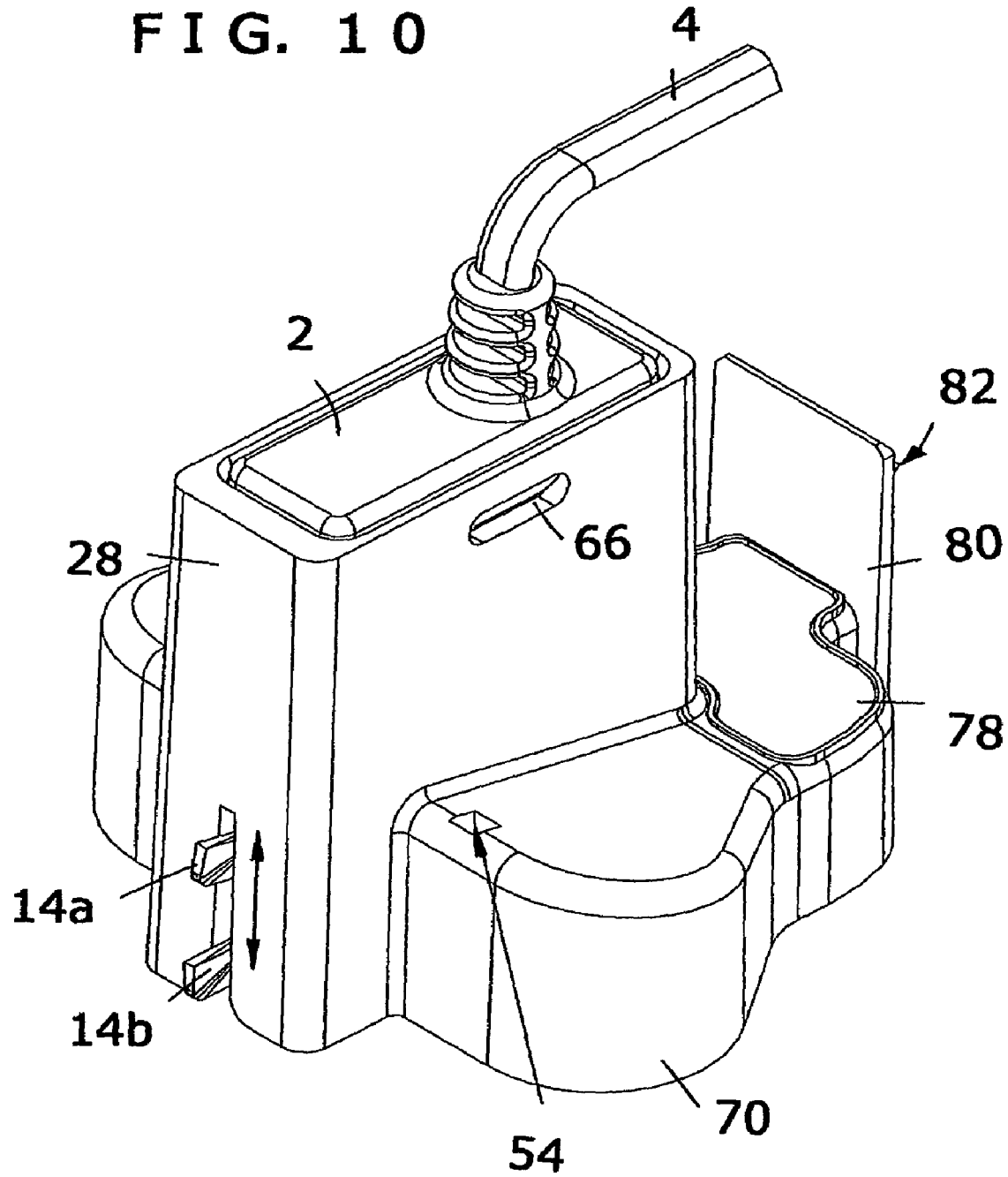
FIG. 10 is a perspective view of the second preferred embodiment of unitary housing shown in FIG. 9 with the second preferred embodiment of encapsulated micro switch positioned in its upper chamber, the label or other covering material in place over the vent openings, and a float body positioned in the lower chamber as evidenced by the lever-like distal end passing through the vertically-extending thin slot, with two positions of the distal end shown, a lowered pre-deployment position and a raised post-deployment (or test) position, with a double-headed arrow identifying the direction of distal end movement.

FIGS. 9-11 show the second preferred embodiment of unitary float/switch housing 28 in the present invention that can be used with the second preferred embodiment of encapsulated micro switch shown in FIG. 8 and the larger/wider float body 12 shown in FIG. 12. While FIG. 9 shows the second preferred embodiment of unitary housing 28 empty, FIGS. 10-11 show the second preferred embodiment of unitary housing 28 having an encapsulated micro switch 2 in upper chamber 32 and a float body 12 within lower chamber 56 (as evidenced by the tip of the lever-like distal end 14 of float body 12 extending through the downwardly widening slot 72 of the second preferred embodiment of unitary housing 28. FIGS. 10 and 11 both show distal end 14 in its raised deployed or test position (as identified by the number 14*a*) and its lowered pre-deployment position (as identified by the number 14*b*), with the double-headed arrow in FIG. 10 showing the direction of distal end 14 movement. As shown in FIGS. 9-11, the height dimension of the taller central portion of unitary housing 28 is substantially uniform, and there is no front cutout area 144 (as seen in the third and fourth preferred embodiments of unitary housing 28, as shown respectively in FIGS. 19 and 25). Further, FIG. 9 shows the horizontally elongated openings 74 near the top edge of housing 28 that are configured for engagement with the opposed elongated protrusions 66 on the second preferred embodiment of encapsulated micro switch 2 (shown in FIG. 8). FIG. 9 also shows the vertically-extending alignment slot 76 on one side of housing 28 at its top edge, which is configured for engagement with the alignment guide 64 shown on the second preferred embodiment of encapsulated micro switch 2 in FIG. 8. FIG. 9-11 all show lower chamber 56 having a widened portion 70 that is configured to house the larger float body 12 shown in FIG. 12, as well as air vents 54 at the front and back of unitary housing 28. The larger configuration of float body 12 places most of its buoyancy remote from its pivoting fulcrum, allowing it to deploy faster in response to small amounts of collected fluid, such as one-fourth of an inch to one-half inch. The shape, number, positioning, and size of air vents 54 are not critical as long as they fulfill their intended function of preventing airlock malfunction of float body 12 during its upward deployment to assure repeat and reliable float body 12 deployment in response to rising fluid. In addition, FIGS. 9 and 10 show a removable float cover 78 that is used to briefly inspect the general surface condition of float body 12 from above, without moving it from its usable location. If algae or debris is found to be present upon such inspection, suitable maintenance can be done to remove it to ensure that float body 12 will continue to have reliable repeat upward deployment. Float cover 78 is preferably made from foam, and although not shown may have information markings on its upper or lower surfaces. FIGS. 9-11 also show a vertically-extending attachment plate 80 connected to the rear portion of the widened portion 70 of lower chamber 56 in a position remote from the narrow/thin downwardly-widening slot 72 at the front portion of unitary housing 28. Near the top of attachment plate 80 and on its rear surface, FIGS. 9-11 show a spring tab 82, which engages the grooved rail plate 92 configuration on a drain connection mount 90 or associated with another drain line connection assembly (such as but not limited to the third preferred embodiment of drain line connection assembly shown in FIG. 23). Preferably, but not limited thereto, spring tab 82 has a 45-degree lead, so it is able to slide up and down for adjustment in one-tenth of and inch increments.

Figure 13:
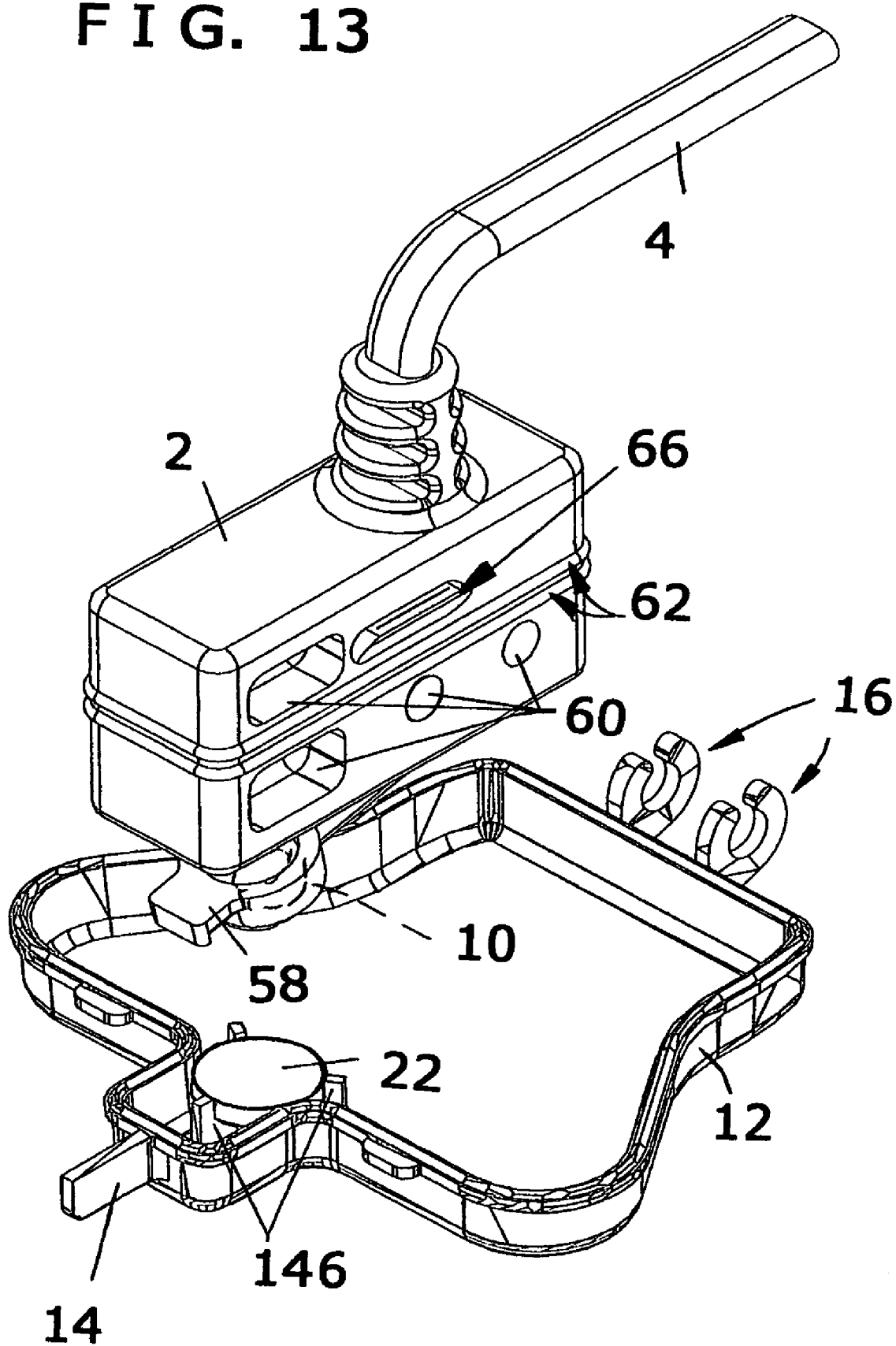
FIG. 13 is a perspective view of the second preferred embodiment of encapsulated micro switch and float body shown in FIG. 12, with the float body top surface removed to reveal the preferred positioning of large permanent magnet contained therein.

FIGS. 12 and 13 show the second preferred embodiment of encapsulated micro switch 2 in FIG. 8 positioned over a preferred configuration of widened float body 12 that can be used with the second preferred embodiment of unitary housing 28 and its widened portion 70 shown in FIGS. 9-11. FIGS. 12 and 13 both show encapsulated micro switch 2 having several cutout areas 60, dual sealing ribs 62, a top protrusion 66, electrical wiring 4 extending upwardly from its top surface, a lever-like arm 6 in an angled and downwardly-extending position below it, a non-metallic slide-on cup extension 58 on arm 6, and a small magnet 10 positioned within cup extension 58. Below encapsulated micro switch 2 FIGS. 12 and 13 both show a widened float body 12 with a lever-like distal end 14 and an opposed proximal end 16 configured to provide the needed pivoting connection for upward shut-off deployment of float body 12 in response to rising fluid levels and downward reset of float body 12 into a lowered position after deployment for subsequent deployment. While FIG. 12 shows the larger magnet 22 in broken lines within float body 12, hidden by top surface 84, FIG. 13 shows float body 12 with its top surface 84 removed and the larger permanent magnet 22 in solids lines and positioned within a retaining mount 146 to maintain it in a fixed position during pivoting movement of float body 12. Whether top surface 85 is temporarily or permanently attached to the remainder of float body 12 is not critical.

Figure 14:
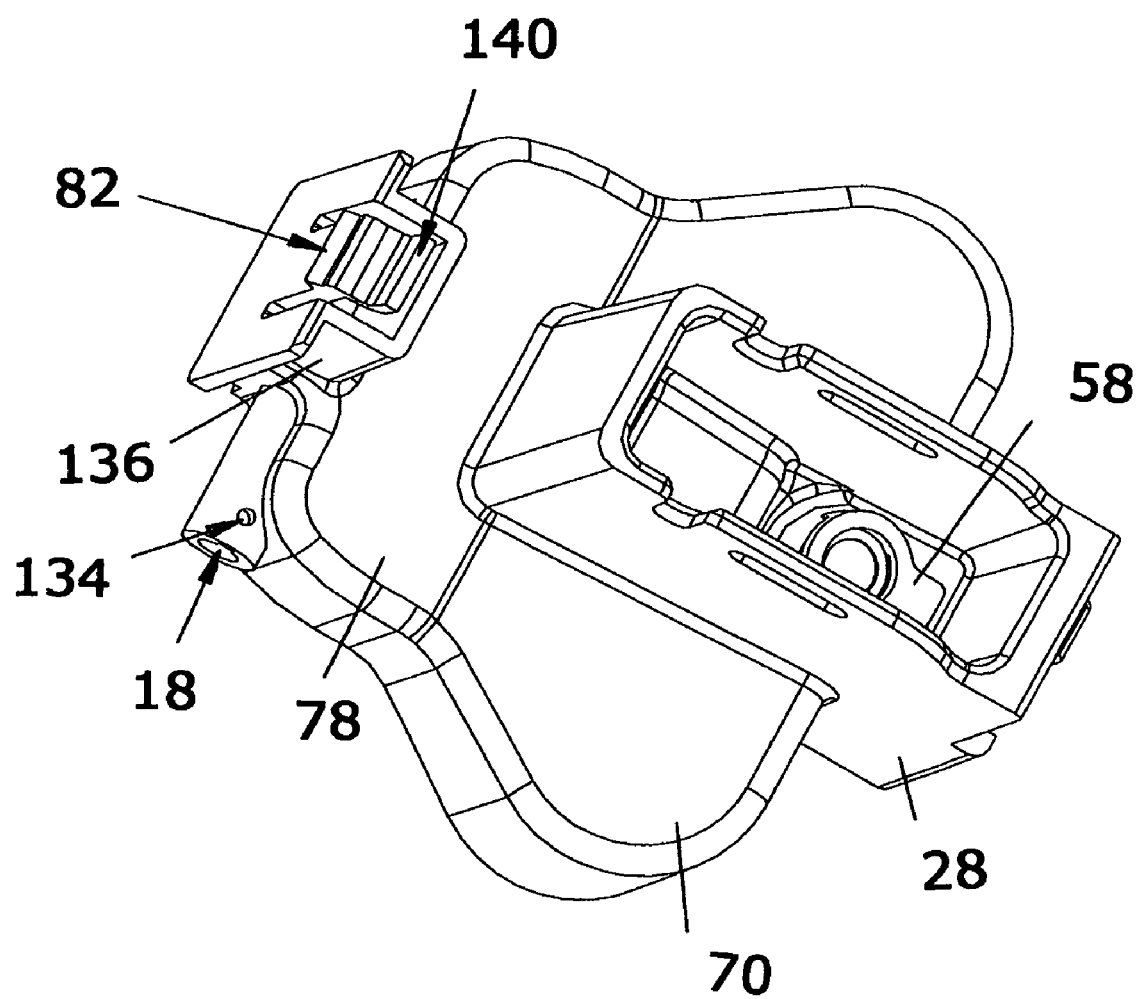
FIG. 14 is a perspective view of a third preferred embodiment of the unitary float/switch housing in the present invention having opposed alignment slots, an external pivot pin for float body movement, and a box-style attachment member with plate-like rear surface having a spring tab, and which is used with the third preferred embodiment of encapsulated micro switch and float body shown in FIG. 20.

FIG. 14 shows a third preferred embodiment of a unitary housing 28 in the present invention having a box-style attachment member 136 with plate-like rear surface having a spring tab 82. Additionally, FIG. 14 shows the top of the plate-like rear surface having an enlarged upper piece 140 configured for quick manual release of spring tab 82 from the grooved rail plate surface on the rear wall of the upright member 98 used for connection of unitary housing 28 to a drain connection mount 90 or drain line connection assembly having a mounting plate 26. Like the second preferred embodiment of unitary housing 28, the third embodiment has a widened portion 70 of lower chamber 56. Another difference between the third and second preferred embodiments of unitary housing 28 is that the third preferred embodiment has a front cutout area 144 that is not identified in FIG. 14 by number since it is not clearly shown, but is clearly shown and marked by the number 144 in FIG. 19. FIG. 14 also shows the third preferred embodiment of the unitary housing 28 having opposed alignment slots 76 (identified by the number 76 in FIGS. 16 and 17), a float cover 78 that may be removable from widened portion 70 for float body 12 inspection, and an external pivoting structure with a locking hole 134 that can be used with common fastening/locking means (not shown) and the locking configuration disclosed for locking pin 34 in FIG. 32, to retain pivot pin 34 in a fixed location during its use for reliable and repeat vertical deployment of float body 12. Lastly, FIG. 14 shows the slide-on cup 58 in its preferred position if use within the upper chamber 32 of unitary housing 28. Preferably, slide on cup 58 is made from non-magnetic materials.

Figure 15:
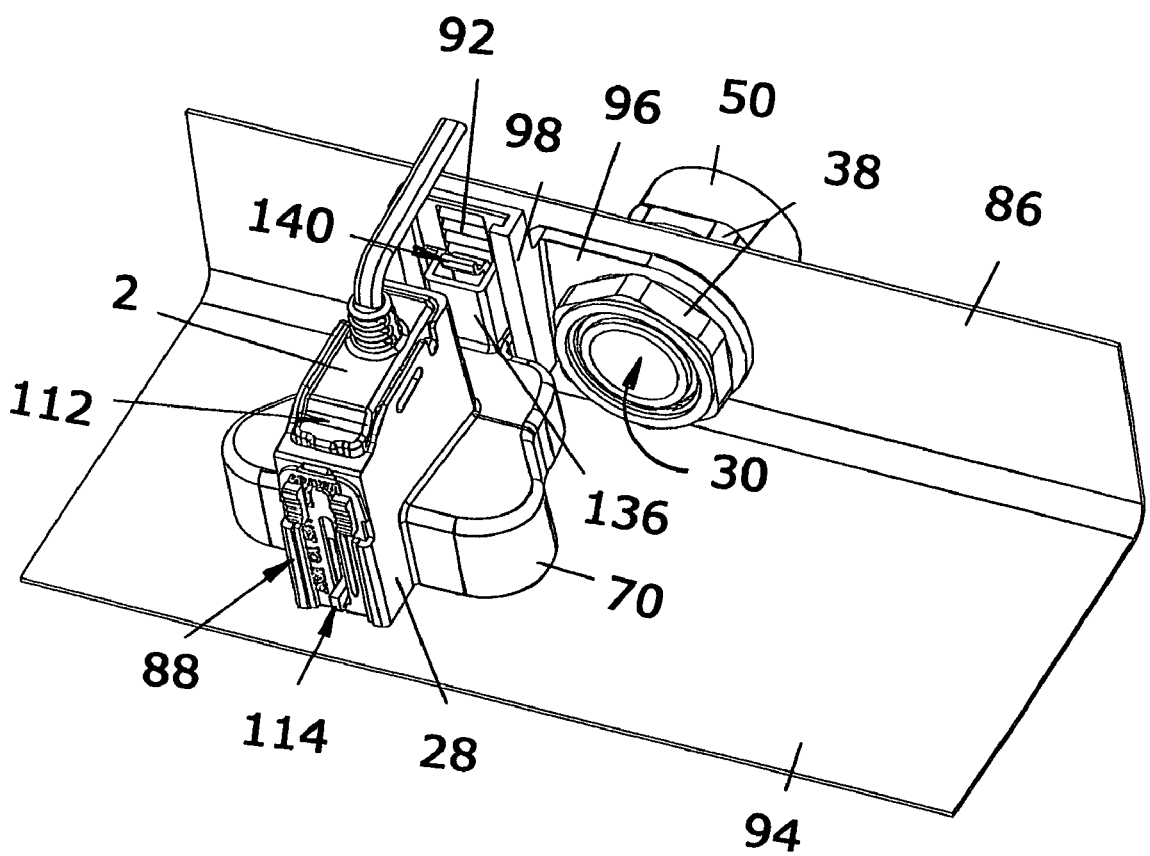
FIG. 15 is a perspective view of the third preferred embodiment of unitary housing attached to the wall of a fluid-collecting pan via a second preferred embodiment of drain connection mounting assembly having the drain connection mount shown in FIG. 21 and a tailpiece secured to the mount so that it becomes rearwardly extending from the wall, the mount further having a rail plate that allows variable vertical adjustment of the float body according to application need and from which the spring tab on the unitary housing is easily separable, the unitary housing also having a slide adjust test plate secured around its vertically-extending narrow/thin slot.

FIGS. 15-21 show the third preferred embodiment of unitary housing 28 (seen in FIG. 14) in association with drain connection mount 90, which is shown in most detail in FIG. 21. As shown in the various views disclosed in FIGS. 15-21, drain connection mount 90 has an upright member 98 with a grooved rail plate 92 used for engagement of the spring tab 82 on the back of the plate-like rear surface of the box-style attachment member 136 connected to unitary housing 28. FIG. 15 also shows drain connection mount 90 having a D-shaped ring member depending from one side of upright member 98. As identified in FIG. 22, upright member 98 has a T-shaped slot 116 configured for insertion of an attachment plate 80 or the plate-like rear surface and spring tab 82 of the box-style attachment member 136. FIG. 15 shows the enlarged upper piece 140 used to release the spring tab 82 on the back side of the plate-like rear surface of box-style attachment member 136 from its engagement with the grooved rail plate 92 on the back wall of upright member 98. In addition, FIG. 15 shows the third preferred embodiment of unitary housing 28 attached to the upright perimeter wall 86 of a fluid-collecting pan 94, while FIGS. 16-20 show views of the third preferred embodiment of unitary housing 28 and an attached drain connection mount 90 from differing angles.

FIG. 15 also shows unitary housing connected to drain connection mount 90, and drain connection mount 90 attached with two hex nuts 38 to perimeter wall 86. A first hex nut 38 is shown positioned within pan 94, with a second hex nut 38 being shown positioned against the hidden outside surface of pan 94. FIG. 15 further shows a tailpiece 50 aligned with a discharge opening 30 through perimeter wall 86 and connected to the hidden outside surface of wall 86 by the second hex nut 38, whereby excess fluid collected in pan 94 can travel through discharge opening 30 and exit pan 94 via tailpiece 50 extending rearwardly from pan 94. Another feature of the third preferred embodiment of unitary housing 28 shown in FIG. 15 is the slide adjust plate 88 attached to the front end of unitary housing 28 for use in rapid and easy post-installation testing of float body 12 to confirm its proper deployment for long term reliable use. FIG. 15 also shows the distal end 114 of the magnet cover 118 (shown in FIG. 22) extending through the vertically-extending closed slot 142 centrally through slide adjust plate 88. Although not shown, it is contemplated and preferred for closed slot 142 to be aligned with a downwardly widening slot through the front portion of unitary housing 28, similar to the downwardly widening slot 72 shown in FIG. 24 for the fourth preferred embodiment of unitary housing 28.

Figure 17:
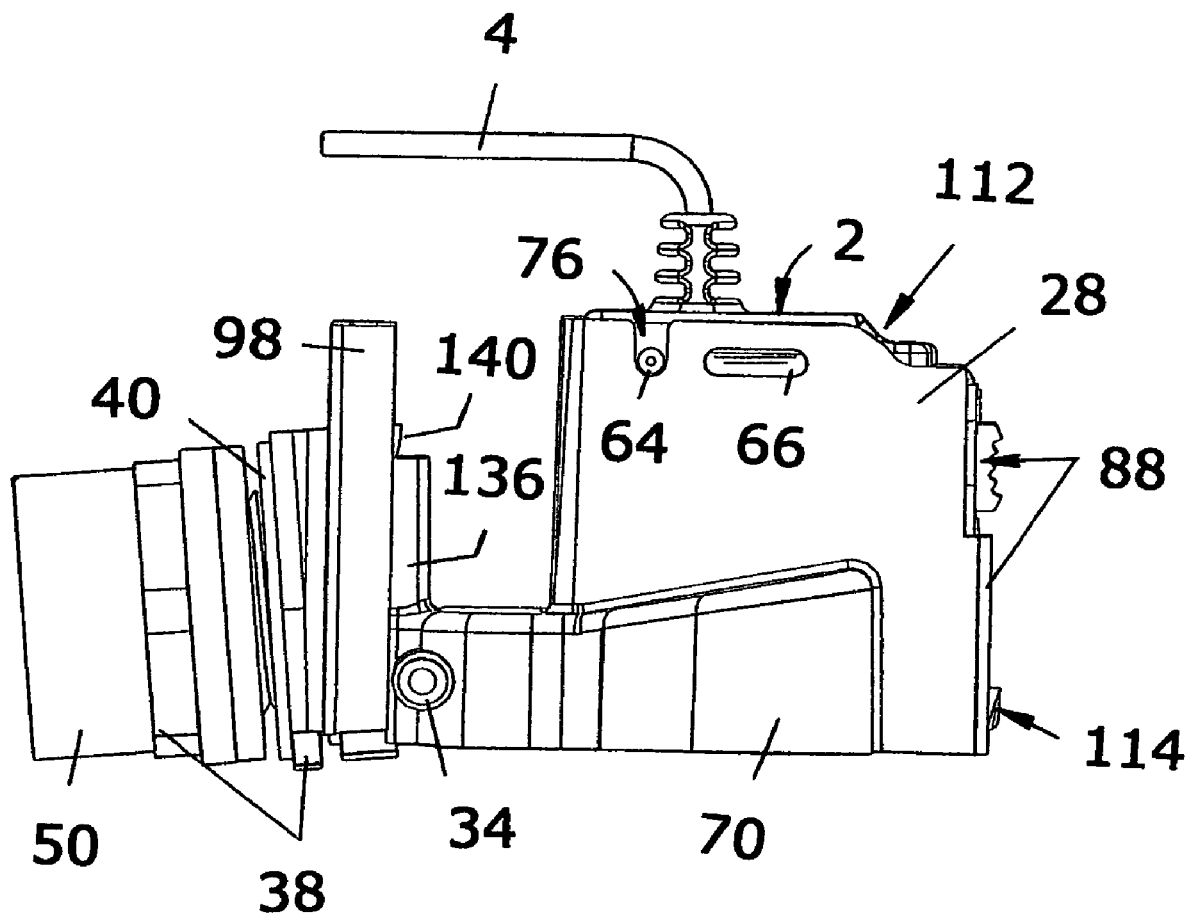
FIG. 17 is a left side view of the third preferred embodiment of unitary housing and the second preferred embodiment of drain connection mounting assembly shown in FIG. 15 that reveals the float body in its non-deployed position.

FIGS. 16-21 reveal in greater detail the structure and relation to one another of various features in the third preferred embodiment of unitary housing 28. The side views of FIGS. 16 and 17 show an encapsulated micro switch 2 housed within the upper chamber of unitary housing 28 and the connection of drain connection mount 90 (collectively upright member 98 and D-shaped ring member 96) between unitary housing 28 and tailpiece 50, which could be temporarily or permanently plugged (perhaps with the plug 42 shown in FIG. 5), or connected to a drains line (not shown). The front top portions of encapsulated micro switch 2 and unitary housing 28 are also respectively shown in FIGS. 16 and 17 to have similarly configured material-saving cutout areas 112 and 144 (the area designated with the number 144 is shown in FIGS. 19 and 25). FIGS. 16 and 17 further show unitary housing 28 having a lower chamber with a widened portion 70 configured to accommodate the shape of a widened float body 12, the horizontally-elongated snap-in protrusion 66 on the upper portion of the encapsulated micro switch 2 exposed through unitary housing 28, the alignment guide 64 on one side of encapsulated micro switch 2 positioned within the vertically-extending alignment slot 76 on the upper edge of unitary housing 28, electrical wiring extending upwardly from the top of encapsulated micro switch 2, the slide adjust plate 88 secured against the front portion of unitary housing 28. In addition, FIGS. 16 and 17 show the box-style attachment member 136 depending from the rear portion of unitary housing 28 and the enlarged upper piece 140 of attachment member 136 configured for quick manual release of the plate-like rear surface of box-style attachment member 136 from upright member 98. When the enlarged upper piece 140 is manually engaged to release the spring tab 82 (shown in FIG. 14) from the grooved rail plate structure 92 (shown in FIG. 20), unitary housing can be manually lifted in an upward direction to slide the plate-like rear surface of box-style attachment member 136 from the T-shaped slot 116 of upright member 98. FIGS. 16 and 17 further show two hex nuts 38 and a seal 40 connecting the D-ring shaped member 96 (one part of drain connection mount 90) to tailpiece 50. Seal 40 is positioned between D-ring shaped member 96 and tailpiece 50. For the convenience of an installer, the present invention could be assembled as shown in FIGS. 16 and 17 with encapsulated micro switch 2 positioned within the upper chamber 32 of unitary housing 28, float switch 12 within the lower chamber 56 of unitary housing 29 and the distal end 114 of its magnet cover 118 exposed through the front portion of unitary housing 28 in a pre-deployment position, the plate-like rear surface of box-style attachment member 136 secured within the T-shaped slot 116 of upright member 98 (one part of drain connection mount 90), and the D-ring shaped 96 of drain connection mount 90 attached to a tailpiece 50 via two hex nuts 38 (capable of being tightened manually without tools) and seal 40. Then, upon arrival at a worksite with a fluid connection pan having a drain hole and a need for fluid level monitoring, the installer would merely remove seal 40 and the adjacent hex nut 38 from behind D-ring shaped member 96, insert tailpiece 50 through the drain hole in the pan so that the rear surface of the D-ring shaped member 96 is positioned against the inside surface of the fluid collection pan's upright perimeter wall. Thereafter, the installer would simply have to position seal 40 over tailpiece 50 and move it against the outside surface of the fluid collection pan's upright perimeter wall, after which the installer would place hex nut 38 over tailpiece 50 and manually tighten its threaded engagement to securely fix unitary housing 28 in place for long term support by the fluid collection pan's upright perimeter wall. When the installer places the bottom surfaces of D-ring shaped member 96 and upright member 98 against the bottom of the fluid collection pan (or at least parallel to it), the float body 12 within unitary housing 28 is automatically leveled when the pan itself is leveled. Thus, a time-saving benefit for the installer is derived. The only adjustment of unitary housing 28 that an installer might need to make to finalize installation is to raise unitary housing 28 so as to set a different threshold fluid collection depth before float body 12 deploys and a shut-off signal is sent by encapsulated micro switch 2 to stop fluid production. Therefore, instead of having to tediously adjust the height of float body 12 and perhaps remove it from its housing to do so, as was commonly done in the prior art, and installer using the third preferred embodiment of unitary housing 28 and drain connection mount 90 can easily adjust the height of float body 12 by a simple raising of unitary housing 28 through manual engagement of the enlarged upper piece 140 to release the spring tab 82 connected to it from the grooved rail plate structure 92 on upright member 98. Once spring tab 82 is so released, the installer can raise (or possibly lower) the plate-like rear surface of box-style attachment member 136 relative to upright member 98 by manually sliding it up or down within the T-shaped slot 116 of upright member 98. When the desired height for unitary housing 28 and the float body 12 positioned within its lower chamber 56 is reached, the installer simply releases the enlarged upper piece 140 to cause spring tab 82 to again become engaged with the grooved rail plate structure 92 on upright member 98. If the newly selected height of float body 12 is still not optimum in the application, the steps of manually engaging enlarged upper piece 140 and sliding the plate-like rear surface of box-style attachment member 136 up or down relative to upright member 98 can be quickly and easily repeated. Although partially obscured and unmarked in FIG. 16, FIG. 17 also shows the pivot pin 34 through the widened portion 70 of unitary housing 28 that is used to allow the pivoting movement of float body 12 within widened portion 70.

FIG. 18 shows an encapsulated micro switch 2 positioned within the upper chamber 32 of the third preferred embodiment of unitary housing 28 in the present invention and the electrical wiring 4 of encapsulate micro switch extending upwardly from its top surface for connection to a fluid-producing system or unit (not shown). Unitary housing 28 and its widened portion 70 are positioned in front of upright housing 98 and the D-ring shaped member 96 depending from it toward the right (which together form drain connection mount 90). FIG. 18 also shows a hex nut 38 positioned in front of D-ring shaped member 96. The opening 30 shown through hex nut 38 provides fluid communication to a tailpiece 50 (and perhaps also to a drain line connected to tailpiece 50) that directs from the pan to which the present invention is connected any excess fluid that poses a risk of damage to surroundings. In addition, FIG. 18 shows slide adjust plate 88 positioned against the front of unitary housing 28 and the distal end 114 of the magnet cover 118 on float body 12 exposed through the front portion of unitary housing 28 in a pre-deployment position.

FIG. 19 shows a bottom view of the third preferred embodiment of unitary housing 28 and float body 12 substantially filling the widened portion 70 of lower chamber 56. Float body 12 is held in pivotal connection to unitary housing 28 via pivot pin 34. In FIG. 19, an encapsulated micro switch 2 is also associated with the upper chamber 32 of unitary housing 28. One of the opposed snap-in protrusions 66 on encapsulated micro switch 2 is exposed through a horizontally-extending slot (identified by the number 74 in FIG. 23) in the upper portion of unitary housing 28, with FIG. 19 also showing the material-saving cutout area 144 on the front portion of unitary housing 28. FIG. 19 further shows the slide adjust plate 88 attached to the front portion of unitary housing 28 and its rear portion fixedly secured to the upright portion 98 of drain connection mount 90. The D-ring shaped member 96 of drain connection mount 90 depending from upright member 98 is shown in FIG. 19 connected by two hex nuts 38 and a seal 40 to tailpiece 50. The discharge opening 30 through tailpiece 50 permits excess fluid in the pan with which the present invention is associated to exit the pan and be prevented from causing damage to surroundings.

Figure 24:
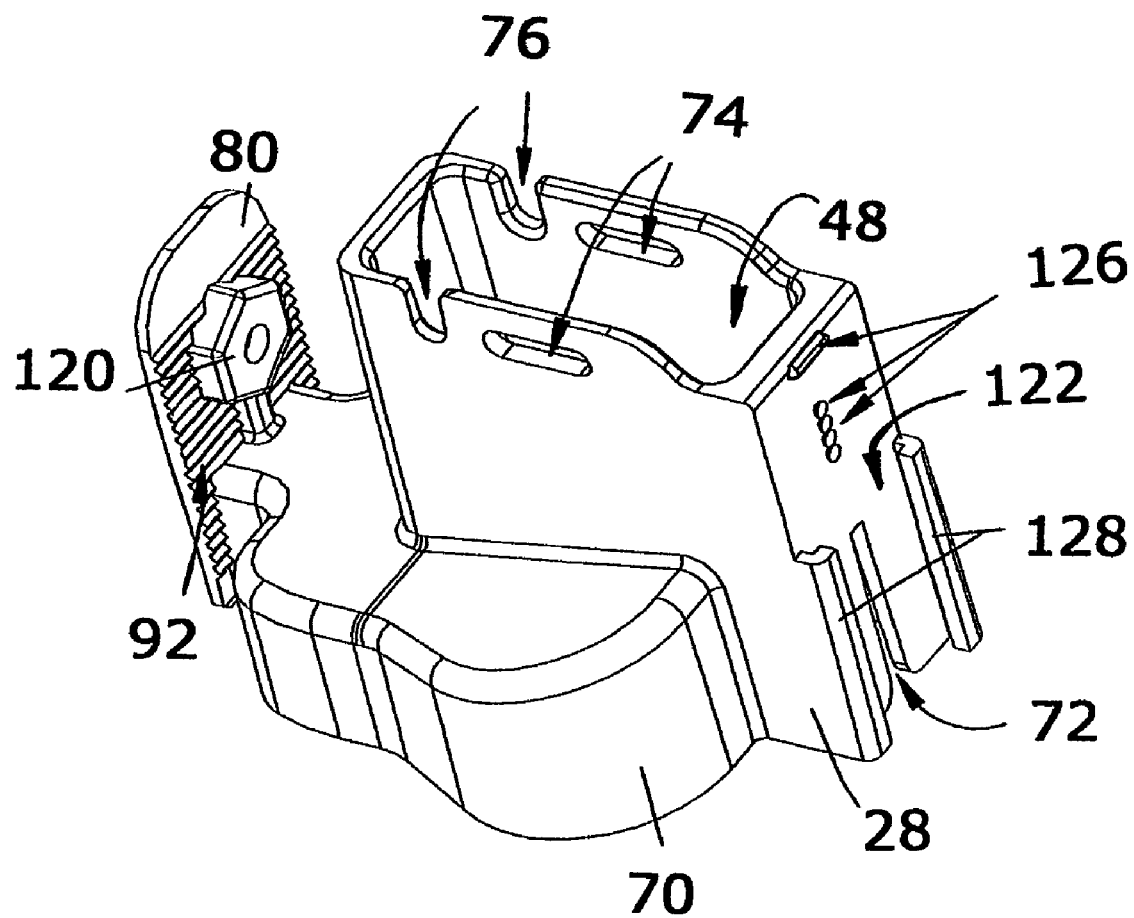
FIG. 24 is a perspective view of the fourth preferred embodiment of present invention unitary float/switch housing having an attachment plate with an integrated rail plate, and the attachment plate also having a hex indentation configured securing a removable fastener when the attachment plate needs to be firmly fixed within the upright member shown in FIG. 26 at one end of the bridge that connects the unitary housing to a mounting plate, with the unitary housing also having alignment protrusions and elongated guide rails configured for securing the slide adjust plate against the front of the unitary housing.

FIG. 20 is an exploded view of all components shown in FIGS. 15-19 except the unitary housing 28 and small magnet 10, and shows relative component positioning one to the other during use. Encapsulated micro switch 2 is shown with one of its opposed horizontally-extending snap-in protrusions 66, several material-saving cutout areas 60, alignment guide 64, attached electrical wiring 4, and the unmarked top front material-saving cutout area (identified in FIG. 33 by the number 112). Encapsulated micro switch 2 is positioned above float body 12 so that its slide-on non-metallic cup 58 (holding a hidden small magnet 10) is positioned above the larger magnet 22 in float body 12, which is shown in broken lines under the magnet cover 118. FIG. 20 also shows slide adjust plate 88 in front of encapsulated micro switch 2 and float body 12, with the distal end (test latch) 114 of magnet cover 118 extending through the vertically-extending closed slot 142 centrally through slide adjust 88. FIG. 20 also shows slide adjust plate 88 having two upper non-slip members 130 configured for manual vertical adjustment of slide adjust plate 88 during its installation on the front portion of unitary housing 28 wherein the laterally-positioned and horizontally-extending elongated bars 148 shown on the front of slide adjust plate 88 become inserted in the front channel 122 (shown in FIG. 24) defined by the elongated laterally-positioned guide rails 128 (shown in FIGS. 24 and 25). FIGS. 24 and 25 show the fourth preferred embodiment of unitary housing 28 having the channel 122 defined by guider rails 128, alignment/adjustment protrusions 126, and downwardly widening slot 72 that becomes aligned with the vertically-extending closed slot 142 centrally through slide adjust 88. Although not otherwise visible in the accompanying drawings, it is contemplated for the portion of third preferred embodiment of unitary housing 28 behind slide adjust plate 88 to be configured similarly to that shown in FIG. 24 for the fourth preferred embodiment of unitary housing 28. FIG. 20 also shows the rear portion of float body 12 to have a proximal end 16 configured to provide pivoting connection of float body 12 for vertical deployment in response to riding fluid beyond a threshold level considered safe. The pivot pin 34 used to pivotally connect the proximal end 16 of float body 12 to unitary housing 28 is also shown in FIG. 20. In addition, FIG. 20 shows the drain connection mount 90 (with its upright member 98 and its D-ring shaped member 96) connected to a tailpiece 50 via two hex nuts 38 and a seal 40. The grooved rail plate 92 on the rear wall of the T-shaped slot in upright member 98 is also identified in FIG. 20. As previously stated, the configurations and relative dimensions of most of the components in FIG. 20 can be different from that shown, since a multitude of equivalent constructions are possible for the present invention insofar as they do not depart from its spirit and scope.

FIG. 21 shows an enlarged view of the drain connection mount 90 that is a part of the second preferred embodiment of drain connection mounting assembly shown in FIG. 15. A D-ring shaped member 96 having an opening 30 configured for fluid communication with a drain line and laterally depending from an upright member 98. The upright member 98 has a T-shaped slot 116 and a grooved rail plate 92 on the back inside surface of slot 116, which allows variable vertical adjustment of the float body 12 according to application need via engagement of the spring tab 82 on the unitary housing 28. While in the accompanying illustrations drain connection mount 90 is shown used with the second and third preferred embodiments of unitary housing 28, use is also contemplated with other preferred embodiments of the present invention as long as the other preferred embodiments have a plate (such as the attachment plate 80 in FIG. 11 or FIG. 24) and some structure to engage grooved rail plate 92 (such as the spring tab 82 in FIG. 11). Although drain connection mount 90 can be made from differing types of materials, it should be made corrosion-resistant and rigid so that the orientation of float body 12 does not change over time and prevent it from proper deployment. Also, the size of the opening 30 in D-ring shaped member 96 will vary according to the application, and may be different from that shown. Further, the size of number of grooved rail plate 92, the number of grooves in rail plate 92, and the configuration of grooves in rail plate 92 may be different from that shown.

Figure 22:
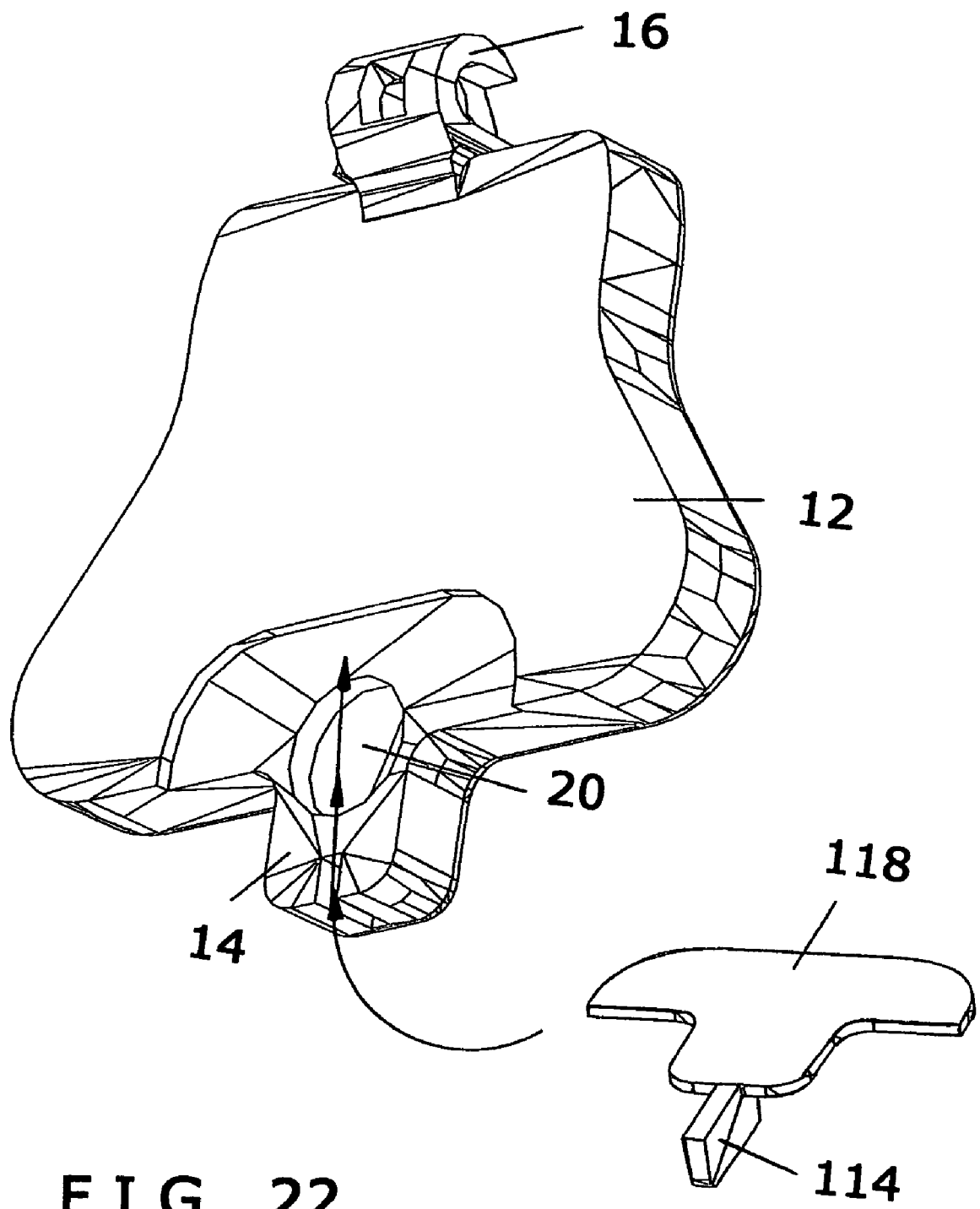
FIG. 22 is an exploded view of the preferred embodiment of float body used with the third preferred embodiment of unitary housing shown in FIGS. 14-19 and its lever-like distal end, a depression adjacent to the distal end configured for housing a large magnet, a pivoting connection in a position remote from the distal end, and the cover placed over the depression removed to reveal the depression.

FIG. 22 shows a third preferred embodiment of float body 12, which is shown in use with the third preferred embodiment of unitary housing 28 in FIGS. 15-18. When the magnet cover 118 is removed from float body 12, a hollow area 20 is revealed within float body 12 sized and configured for holding larger magnet 22 in a desired position of use. A similar hollow area 20 was shown in FIG. 1 with the first preferred embodiment of unitary housing 28. Hollow area 20 is in contrast to the retaining mount 146 within the second preferred embodiment of float body 12 shown in FIG. 13, which is configured for placing larger magnet 22 in a fixed position within float body 12 during a deployment response to rising fluid. Magnet cover 118 fits over the distal end 14 of float body 12, has a distal end of its own (also referred to as test latch) 114 that is shown in FIG. 20 extending through slide adjust plate 88. As with the materials used with float body 12, the materials used for magnet cover 118 should be corrosion-resistant and lightweight. Magnet cover 118 can also be configured to slide or be snap-fit into place on float body 12, or be permanent fixed against float body 12 during manufacture. Further, the materials from which test latch 114 is made should be rigid for easy finger manipulation to confirm proper height adjustment and deployment of float body 12. FIG. 22 also shows a preferred configuration of the proximal end of float body 12 used to accomplish its pivoting movement, however the configuration is not critical and can be replaced by other structure fulfilling the same function.

FIG. 23 is a rear view of the third preferred embodiment of present invention unitary float/switch housing 28 detachably secured to a third preferred embodiment of drain connection mounting assembly via engagement of upright member 98 to box-style attachment member 136. The enlarged upper piece 140 of box-style attachment member 136 is also shown in FIG. 23, which is configured for quick release of the spring tab 82 associated with box-style attachment member 136 from the grooved rail plate 92 within the T-shaped slot 116 of upright member 98. Although no encapsulated micro switch 2 is shown in the upper chamber 32 of unitary housing 28 in FIG. 23, it shows the pair of opposed, elongated, and substantially horizontally-extending openings 74 in unitary housing 28, as well as the opposed vertically-extending alignment slots 76 in the upper edge of unitary housing 28, which are used to facilitate placement of encapsulated micro switch 2 within upper chamber 32 and long term retention of encapsulated micro switch 2 in its desired position of use. FIG. 23 also shows the lower chamber 56 of unitary housing 28 having a widened portion 70, the pivot pin 34 extending through unitary housing 28 that allows for pivoting deployment of float body 12 in response to rising fluid (not shown), and the slide adjust plate 88 secured to the front portion of unitary housing 28 in a position remote from pivot pin 34. Only one of the non-slip members 130 on slide adjust plate 88 is visible, although as shown in FIG. 20 it is preferred for slide adjust plate 88 to have two non-slip members 130. FIG. 23 also shows a bridge 100 connecting upright member 98 to a mounting plate 26 with wrap-around sides 52 that is configured for rapid and easy positioning over a generally trapezoidal shelf (not shown herein) molded into the upright perimeter wall of a plastic fluid-collecting pan. When an installer slides mounting plate 26 downwardly over such a shelf molded into an upright fluid collection pan wall, the float body 12 positioning within the associated unitary housing 28 becomes leveled relative to the pan, so that when the pan is leveled proper and reliable deployment of float body 12 can be repeatedly expected. To prevent any inadvertent or other premature release of mounting plate 26 from a complementarily configured shelf in pan wall, and also for connection of a tailpiece 50 to the fluid discharge opening (shown by the number 30 in FIG. 2) in mounting plate 26 (the supporting pan wall also has an opening 30 through it, but typically without a dam 36), FIG. 23 shows a hex nut 38 tightened against the rear surface of mounting plate 26. FIG. 23 further reveals a seal 40 between hex nut 38 and mounting plate 26 to prevent unwanted fluid leakage from opening 30. Although connection of tailpiece 50 to a drain line is an option, FIG. 23 shows a plug 42 blocking the distal end of tailpiece 50.

FIGS. 24 and 25 show a fourth preferred embodiment of present invention unitary float/switch housing 28 having an attachment plate 80 with an integrated rail plate 92 and a hex indentation 120 configured insertion of a threaded fastener 108 (such as that in FIG. 31). As shown in FIG. 28, it is contemplated for integrated rail plate 92 to engage a grooved rail plate 92 on the front interior surface of at least one side of T-shaped slot of an upright member 98. This is in contrast to the engagement of a spring tab 82 on a non-grooved attachment plate 80 (as in FIG. 11) with the grooved rail plate 92 on the rear interior surface of the T-shaped slot 116 of an upright member 98 (as shown in FIG. 21). Although no encapsulated micro switch 2 is shown in the upper chamber 32 of unitary housing 28, FIGS. 24 and 25 show the fourth preferred embodiment of unitary housing 28 having a pair of opposed, elongated, and substantially horizontally-extending openings 74 in unitary housing 28, as well as the opposed vertically-extending alignment slots 76 in the upper edge of unitary housing 28, which are used to facilitate placement of encapsulated micro switch 2 within upper chamber 32 and long term retention of encapsulated micro switch 2 in its desired position of use. FIGS. 24 and 25 also show the widened portion 70 of lower chamber 56, the cut-away area 144 on the top front portion of housing 28 that is similar in configuration to the material-saving cutout area 112 on the top front portion of encapsulated micro switch 2 (shown in FIG. 33), and several alignment protrusions 126 on the front portion of unitary housing 28 that in combination with guide rails 128 assist an installer in fast and accurate placement of a slide adjust plate 88 relative to downwardly widening slot 72 that assists in the drainage of widened portion 70 when fluid levels in an associated collection pan subside. The three vertically-stacked and round alignment protrusions 126 seen in FIG. 24 can also be used to adjust the height of a slide adjust plate 88 relative to unitary housing 2 within the front channel 122 defined by guide rails 128. In addition, FIG. 25 shows the fourth preferred embodiment of unitary housing 28 having a material-saving cutout 124 in the top surface of the lower chamber 56 which does not provide fluid communicate between lower chamber 56 and upper chamber 32.

FIGS. 26 and 27 show the attachment of the fourth preferred embodiment of unitary housing 28 and its associated components to a fourth preferred embodiment of drain line connection assembly having an upright member 98 with a front inside grooved rail plate (marked by the number 92 in FIG. 28) that is connected via bridge 100 to a mounting plate 26. While the configuration of bridge 100 shown in FIGS. 26 and 27 is preferred, variations can occur without diminishing its strength or departing from the spirit and scope of the present invention. While FIG. 26 shows a front view of unitary housing 28 in its relation to upright member 98, bridge 100 and mounting plate 26, FIG. 27 shows a rear view of the same without unitary housing 28 so to reveal the relation of encapsulated micro switch 2, float body 12, large magnet 22, small magnet 10, rotatable quick-release member 102, and slide adjust plate 88 to upright member 98. Either FIG. 26, FIG. 27, or both, show encapsulated micro switch 2 having electrical wiring 4 configured for connection to a fluid producing unit, material saving cutout areas 60, an elongated protrusion 66 configured for snap-fit engagement with one of the substantially horizontally-extending elongated openings in the upper portion of unitary housing 28 (shown in FIGS. 24 and 25) for secure positioning of encapsulated micro switch 2 within upper chamber 32, as well as an alignment guide 64 configured for insertion into one of the substantially vertically-extending slots 76 in the upper edge of unitary housing 28 (also shown in FIGS. 24 and 25) during the installation of encapsulated micro switch 2 into upper chamber 32. Without unitary housing 28 otherwise obscuring the view, FIG. 27 shows non-magnetic lever-like external arm 6 extending downwardly at an angle from encapsulated micro switch 2 and having a slide-on non-metallic cup 58 that holds small magnet 10 above the larger magnet 22 under magnet cover 118 in float housing 12. FIGS. 26 and 27 both show the distal end (or test latch) 114 of magnet cover 118 extending through slide adjust plate 88 and the non-slip members 130 used for easy installation of slide adjust plate 88 against the from portion of unitary housing 28, as well as prompt manual vertical adjustment of slide adjust plate 88 if needed in an application. FIG. 26 shows the widened portion 70 of unitary housing 28 used to protect float body 12 during it use to activate signal generation by encapsulated micro switch 2, and FIGS. 26 and 27 both show preferred positioning of the pivot pin 34 that allow float body 12 to vertically deploy and be repeatedly reset for future upward deployment in response to rising fluid. In addition, FIG. 27 shows the preferred proximal end 16 configuration of float body 12 that permits pivoting engagement with pivot pin 34. further with a rotatable quick-release release member and fastener together tightening the grip between the attachment plate and upright member to firmly fix the unitary housing to the mounting plate. At the proximal end of unitary housing 28, in a position opposed to slide adjust plate 88, FIG. 26 shows unitary housing 28 having an attachment plate 80, and attachment plate 80 secured within an upright member 98 via a rotatable quick-release member 102 and a threaded fastener 108. To release attachment plate 80 from a securely fixed positioning within upright member 98 to adjust the threshold amount of fluid in a collection pan that will cause the upward deployment of float body 12 and activation of encapsulated micro switch 2 to send a shut-off signal, an installer or maintenance worker needs only to hand rotate quick-release member 102 to loosen it, raise or lower attachment plate 80 relative to upright member 98, and then hand tighten quick-release member 102. While FIGS. 26 and 27 show a tailpiece 50 behind mounting plate 26 and a plug 42 secured within the end of tailpiece 50, only FIG. 27 shows the nut 110 and seal 40 positioned between tailpiece 50 and mounting plate 26. Nut 110 is an alternative to the hex nut 38 shown in FIG. 6, which is also used to secure a mounting plate 26 to the upright perimeter wall of a fluid collection pan.

FIG. 28 is a perspective view of the fourth preferred embodiment of drain line connection assembly having an upright member 98 with a front inside grooved rail plate 92 within its T-shaped slot 116, a bridge 100, and a mounting plate 26 without a dam 16 over the lower part of its fluid discharge opening 30. Although not visible in this view, it is preferred for a front inside grooved rail plate 92 to also be positioned laterally on the other side of T-shaped slot 116. FIG. 28 shows the upwardly tapering wrap-around sides 52 on mounting plate 26 that allow it to securely engage a generally trapezoidal-shaped shelf (not shown) molded into the perimeter wall of a fluid collection pan for quick placement of float body 12 and encapsulated micro switch 2 in their desired positions during fluid level monitoring use. Although the configuration of the mounting plate 26 shown in FIG. 28 is preferred, other embodiments of mounting plate 26 can also be used, such as ones having material-saving construction, enhanced strength, or a lack of the chamfered edge (shown but unnumbered in FIG. 28) on the upper front portion of wrap-around sides 52. The upwardly tapering wrap-around sides 52 on mounting plate 26 allow it to slide easily downward over a shelf having complementary trapezoidal configuration, with gravity providing a constant force that pulls mounting plate 26 more tightly in place over the mated shelf during long term use rather than providing a force that could lead to its eventual unseating from the shelf where by the proper deployment of the float body 12 could be disrupted. The length of bridge 100 may vary, and would depend on the intended application. FIG. 28 further shows threads 48 behind mounting plate 26 that would be used with a female threaded nut (such as hex nut 38 or the nut 110 with ridged exterior shown in FIG. 30) to fix mounting plate 26 securely in place against the upright perimeter wall of a fluid collection pan. In addition, FIG. 28 shows a tailpiece 50 extending rearwardly beyond threads 48, which may be detachable from mounting plate 26 or permanently secured to it. Lastly, FIG. 28 shows a stop 138 centrally against the bottom interior rear wall of upright member 98 within T-shaped slot 116, which is used for proper alignment of attachment plate 80 (or a similar device) within upright member 98 to proper level and otherwise position float body 12 for deployment when a threshold fluid level considered safe is reached so that damage to surroundings is avoided.

Figure 33:
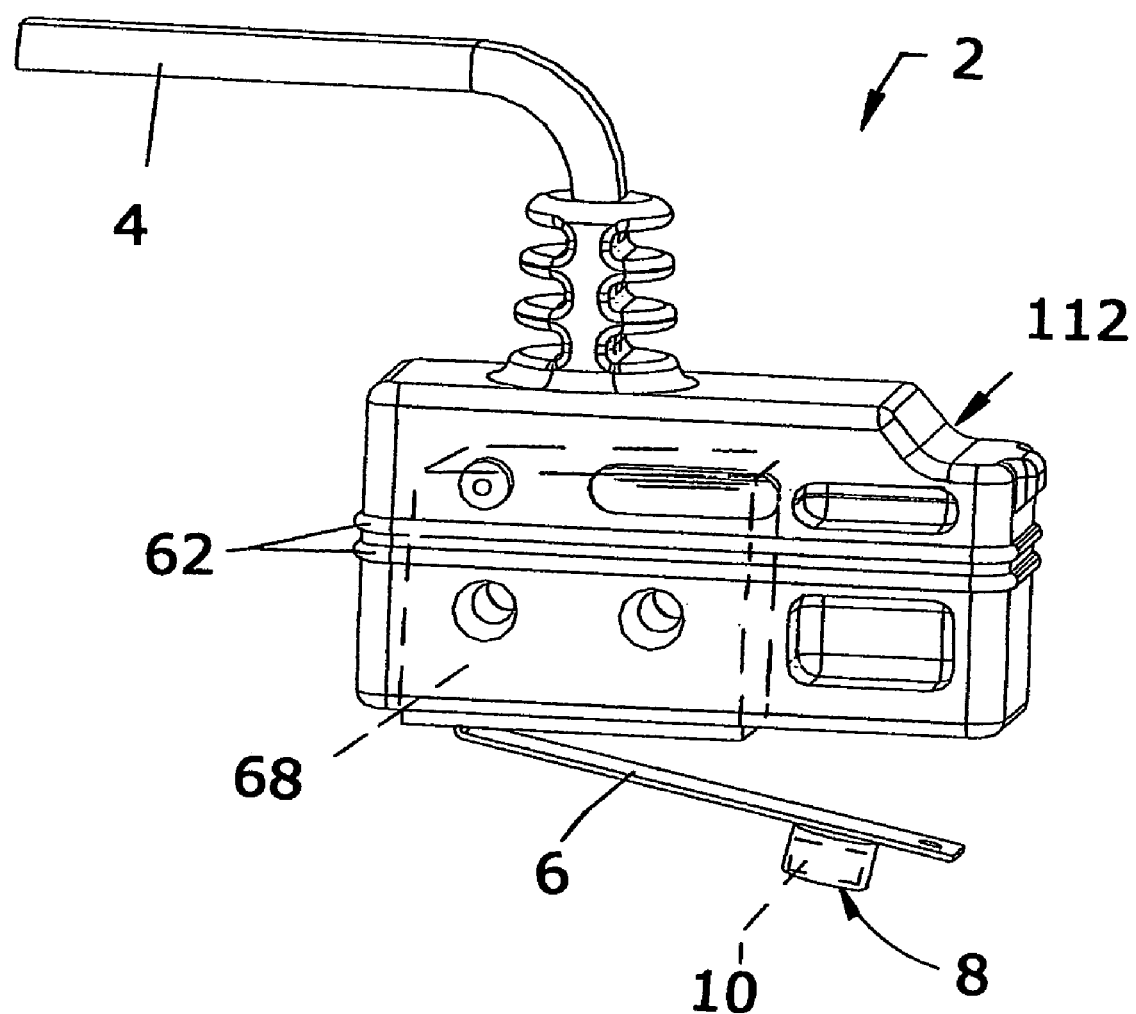
FIG. 33 is a side view of a third preferred embodiment of encapsulated micro switch having a material-saving cutout area on its top surface.

The components of the present invention shown in FIGS. 29-33 have been explained in the discussions hereinabove for other illustrations. FIG. 29 is a perspective view of the threaded rotatable quick-release member 102 that in combination with the fastener 108 shown in FIG. 31 securely fixes the attachment plate 80 of the fourth preferred embodiment of unitary housing 28 within upright member 98 to position unitary housing 28 in fixed relation to the perimeter wall of a fluid collection pan. The knurled exterior 104 of quick-release member 102 makes its manual rotation by an installer easier and non-slip. FIG. 29 also shows female threads configured for engagement with those on the fastener 108 shown in FIG. 31 and the open center 106 of quick-release member 102. During the use of fastener 108 to fix quick-release member 102 against the front of upright member 98, the hex-shaped head of fastener 108 is housed within the hex indentation 120 shown on attachment plate 80 in FIG. 24. By insetting the hex-shaped head of fastener 108 within hex indentation 120, the hex-shaped head of fastener 108 does not interfere with the insertion or removal of attachment plate 80 from the T-shaped slot 116 of upright member 98. Further, FIG. 30 shows an alternative configuration of nut 110 used in the fourth preferred embodiment of the drain line connection assembly to fix mounting plate 26 securely against the perimeter wall of a fluid collection pan. Previously, the hex nut 38 in FIG. 3 was shown in use for the same purpose. In addition, FIG. 32 shows the locking hinge pin 34 preferred in many embodiments of the present invention for pivoting movement of the float body 12 during its vertical deployment, while FIG. 33 shows the third preferred embodiment of encapsulated micro switch 2 having a material-saving cutout area 112 on its top surface, electrical wiring 4 rearward from cutout area 112, dual horizontally-extending sealing ribs 62 configured for preventing fluid from entering upper chamber 32, a hidden micro switch 68 positioned below electrical wiring 4, non-magnetic lever-like external arm 6 extending downwardly from micro switch 68, and a small magnet 10 secured within a preferably non-magnetic cup 8 to arm 6. In FIGS. 17 and 28, the third preferred embodiment of encapsulated micro switch 2 is shown in use with the type of unitary housing 28 having a material-saving cutout area 144 in its front/top portion, immediately behind and above an attached slide adjust plate 88.

What is claimed is:

1. A fluid-level sensing device used with a fluid-producing unit and a fluid collection pan associated with the fluid-producing unit, said device comprising:

a unitary housing with an open-bottomed lower chamber that is positioned at least in part below an open-topped upper chamber, said lower chamber and said upper chamber having no fluid communication therebetween;

a micro switch encapsulated with corrosion-reducing waterproof material, said micro switch having a non-magnetic arm downwardly depending therefrom and electrical wiring configured for connection of said micro switch to the fluid-producing unit;

a buoyant float body having a distal end and a proximal end configured for pivotal connection within said lower chamber so as to provide freely movable vertical deployment of said distal end;

a first magnet associated with said non-magnetic arm; and
a second magnet associated with said vertically deployable distal end of said float body whereby when said encapsulated micro switch is secured within said upper chamber fluid so that said non-magnetic arm is positioned below said encapsulated micro switch and said float body is pivotally connected within said lower chamber with said second magnet positioned below said first magnet, and further when said electrical wiring is connected to the fluid-producing unit and said unitary housing is securely fixed in position relative to the fluid collection pan so that said float body will vertically deploy in response to rising fluid in the pan, and in addition when fluid from the fluid-producing unit collects in the pan and rises beyond a threshold level considered safe to avoid damage to surroundings, said distal end of said float body vertically deploys to bring said second magnet sufficiently close to said first magnet to cause magnetic interaction therebetween, which activates said encapsulated micro switch so that a shut-off signal is sent via said electrical wiring to the fluid-producing unit to stop its fluid production.

2. The fluid-level sensing device of claim 1 wherein said distal end of said float body is at least partially hollow for enhanced buoyancy.

3. The fluid-level sensing device of claim 1 wherein said lower chamber of said unitary housing has a front portion with a vertically-extending slot, and further wherein said distal end of said float body has a lever-like configuration of sufficient length to extend through said vertically-extending slot so that it can be used for manual testing and reset of said float body.

4. The fluid-level sensing device of claim 3 wherein said vertically-extending slot is sufficiently large to serve as an effective air vent in said lower chamber for preventing airlock malfunction of said float body.

5. The fluid-level sensing device of claim 3 wherein said vertically-extending slot is sufficiently narrow to prevent deployment-interfering debris and other non-fluid materials from entering said lower chamber.

6. The fluid-level sensing device of claim 1 further comprising a cup associated with said non-magnetic arm and said cup being sufficiently large for holding said first magnet.

7. The fluid-level sensing device of claim 6 wherein said cup is non-magnetic.

8. The fluid-level sensing device of claim 6 wherein said cup is configured for slide-on engagement with said arm.

9. The fluid-level sensing device of claim 1 wherein said float body is configured for substantially filling said lower chamber.

10. The fluid-level sensing device of claim 1 wherein said lower chamber has at least one air vent configured for preventing airlock malfunction of said float body.

11. The fluid-level sensing device of claim 10 wherein said float body is configured for substantially filling said lower chamber, said lower chamber of said unitary housing has a front portion with a vertically-extending slot, and said distal end of said float body is at least partially hollow for enhanced buoyancy and has a lever-like configuration of sufficient length to extend through said vertically-extending slot so that it can be used for manual testing and reset of said float body.

12. The fluid-level sensing device of claim 1 wherein said encapsulated micro switch has at least one protrusion and said upper chamber has at least one opening therethrough with a configuration complementary to that of said at least one protrusion which together provide a snap-fit connection between said encapsulated micro switch and said upper chamber.

13. The fluid-level sensing device of claim 1 wherein said encapsulated micro switch has at least one alignment guide and said upper chamber has at least one alignment slot with a configuration complementary to that of said at least one alignment guide which together provide facilitated installation of said encapsulated micro switch within said upper chamber.

14. The fluid-level sensing device of claim 1 wherein said encapsulated micro switch has at least one substantially horizontally-extending sealing rib configured for preventing the accumulation of fluid around said non-magnetic arm when said encapsulated micro switch is positioned within said upper chamber.

15. The fluid-level sensing device of claim 1 wherein said lower chamber has a width dimension greater than that of said upper chamber.

16. The fluid-level sensing device of claim 15 wherein said lower chamber has at least one raised air vent opening configured for preventing airlock malfunction of said float body, and further comprising a float cover configured for positioning over said at least one raised air vent opening and blocking debris entry into said lower chamber via said at least one raised air vent opening.

17. The fluid-level sensing device of claim 16 wherein said float cover is made from foam.

18. The fluid-level sensing device of claim 1 wherein said lower chamber of said unitary housing has a width dimension greater than that of said upper chamber and at least one air vent opening, said lower chamber also has a front portion with a vertically-extending slot, said encapsulated micro switch has at least one protrusion and said upper chamber has at least one opening therethrough with a configuration complementary to that of said at least one protrusion which together provide a snap-fit connection between said encapsulated micro switch and said upper chamber, said encapsulated micro switch has at least one alignment guide and said upper chamber has at least one alignment slot with a configuration complementary to that of said at least one alignment guide which together provide facilitated installation of said encapsulated micro switch within said upper chamber, and further comprising a float cover configured for positioning over said at least one air vent opening and blocking debris entry into said lower chamber via said at least one air vent opening.

19. The fluid-level sensing device of claim 18 further comprising a slide adjust plate configured for adjustable positioning against said front portion of said unitary housing and having a centrally positioned slot configured for alignment with said vertically-extending slot in said front portion of said unitary housing.

20. The fluid-level sensing device of claim 18 wherein said unitary housing further comprises a connecting member configured for secure positioning of said unitary housing relative to the pan, said connecting member selected from a group consisting of attachment plates with at least one spring tab configured for engaging a grooved rail plate, attachment plates with at least one grooved rail plate, attachment plates with at least one hex-shaped indentation, box-style attachment members having a rear attachment plate with at least one spring tab configured for engaging a grooved rail plate, manually rotatable quick-release members, fasteners, and nuts.

21. The fluid-level sensing device of claim 18 wherein said float body has a magnet cover with a test latch.

22. The fluid-level sensing device of claim 18 wherein said encapsulated micro switch has an exterior surface with at least one material saving cutout area.

23. The fluid-level sensing device of claim 1 wherein said float body has a magnet cover with a test latch.

24. The fluid-level sensing device of claim 1 wherein said encapsulated micro switch has an exterior surface with at least one material saving cutout area.

25. The fluid-level sensing device of claim 1 wherein said upper chamber and said encapsulated micro switch each have a material-saving and similarly configured top front cut-away area.

26. The fluid-level sensing device of claim 1 wherein said second magnet is fixed into position within said float body by securing means selected from a group consisting of hollow areas and retaining mounts.

27. The fluid-level sensing device of claim 1 further comprising quick-mounting means adapted for attachment to said unitary housing and securing said unitary housing in fixed relation to the perimeter wall of a fluid collecting pan.

28. The fluid-level sensing device of claim 1 further comprising quick-mounting means adapted for securing said unitary housing in a fixed position relative to the fluid collecting pan, said quick-mounting means selected from a group consisting of drain connection mounts having a D-ring shaped member laterally depending from an upright member with a grooved rail plate, drain line connection assemblies having a mounting plate with a front discharge opening and upwardly-tapering wrap-around sides, and bridges.

29. The fluid-level sensing device of claim 28 wherein said unitary housing comprises a connecting member configured for secure positioning of said unitary housing relative to the pan that comprises an attachment plate with at least one grooved rail plate surface, and wherein said quick-mounting means comprises an upright member with a T-shaped slot with at least one grooved rail plate within said T-shaped slot that is adapted for engaging said grooved rail plate surface of said attachment plate to provide vertical adjustment of said unitary housing relative to the fluid collection pan and a change in the amount of fluid required for shut-off signal activation when said attachment plate is adjusted vertically relative to said upright member.

\* \* \* \* \*